United States Patent
Choudhary et al.

(10) Patent No.: US 12,493,718 B2
(45) Date of Patent: Dec. 9, 2025

(54) PROVIDING DATA COLLABORATION VIA A DISTRIBUTED SECURE COLLABORATION FRAMEWORK

(71) Applicant: Adobe Inc., San Jose, CA (US)

(72) Inventors: Sunav Choudhary, Kolkata (IN); Subrata Mitra, Bangalore (IN); Sanjay Sukumaran, Kanhangad (IN); Priyanshu Yadav, Jaipur (IN); Munish Gupta, Shahdol (IN); Jashn Arora, Faridabad (IN); Iftikhar Ahamath Burhanuddin, Bangalore (IN); Gautam Choudhary, Sri Ganganagar (IN); Atharv Tyagi, New Delhi (IN)

(73) Assignee: Adobe Inc., San Jose, CA (US)

( * ) Notice: Subject to any disclaimer, the term of this patent is extended or adjusted under 35 U.S.C. 154(b) by 236 days.

(21) Appl. No.: 18/324,484

(22) Filed: May 26, 2023

(65) Prior Publication Data

US 2024/0394407 A1 Nov. 28, 2024

(51) Int. Cl.
*G06F 21/62* (2013.01)

(52) U.S. Cl.
CPC .............................. *G06F 21/6254* (2013.01)

(58) Field of Classification Search
CPC .. G06F 21/62; G06F 21/6218; G06F 21/6227; G06F 21/6254; G06F 16/245; G06F 16/288; G06F 16/24573; G06F 21/6272; G06F 16/2379; H04L 67/10; H04L 67/16; H04L 67/20; H04L 67/1097; H04L 63/101; H04L 63/272
USPC .......................................................... 726/26
See application file for complete search history.

(56) References Cited

U.S. PATENT DOCUMENTS

| | | | | |
|---|---|---|---|---|
| 11,797,701 | B1* | 10/2023 | Angelo | G06F 16/26 |
| 11,805,167 | B2* | 10/2023 | Chu | H04L 67/1097 |
| 11,886,617 | B1* | 1/2024 | Du | G06F 21/6254 |
| 2018/0165475 | A1* | 6/2018 | Veeramachaneni | G06F 21/6254 |
| 2020/0311294 | A1* | 10/2020 | Sim-Tang | G06F 16/1774 |

(Continued)

OTHER PUBLICATIONS

Arjovsky, M.; Chintala, S.; and Bottou, L. 2017. Wasserstein Generative Adversarial Networks. In Precup, D.; and Teh, Y. W., eds., Proceedings of the 34th International Conference on Machine Learning, vol. 70 of Proceedings of Machine Learning Research, 214-223. PMLR. URL https://proceedings.mlr.press/v70/arjovsky17a.html.

(Continued)

*Primary Examiner* — James N Fiorillo
(74) *Attorney, Agent, or Firm* — Keller Preece PLLC

(57) ABSTRACT

The present disclosure relates to systems, methods, and non-transitory computer-readable media that implements a secure distributed data collaboration architecture for generating synthetic datasets. For example, the disclosed system sends a request to perform a data collaboration with a first dataset of a first local node and a second dataset of a second local node. The disclosed system receives intermediate feature maps from the local nodes that correspond with the datasets and generates a combined feature map. Further, the disclosed system generates a synthetic dataset from the combined feature map by utilizing a central generative model. Moreover, the synthetic dataset generated by the disclosed system is statistically representative of the first dataset and the second dataset.

20 Claims, 18 Drawing Sheets

(56) References Cited

U.S. PATENT DOCUMENTS

| | | | |
|---|---|---|---|
| 2020/0311296 A1* | 10/2020 | Kim | G06F 21/6227 |
| 2021/0200731 A1* | 7/2021 | Aleksandrovich | G06F 16/213 |
| 2021/0279366 A1* | 9/2021 | Choudhury | G06F 16/288 |
| 2022/0391847 A1* | 12/2022 | Barrett | H04L 63/104 |
| 2023/0153448 A1* | 5/2023 | Mitra | G06N 3/08 |
| | | | 726/26 |

OTHER PUBLICATIONS

Bay, A.; Erkin, Z.; Hoepman, J.-H.; Samardjiska, S.; and Vos, J. 2022. Practical Multi-Party Private Set Intersection Protocols. vol. 17, 1-15. doi:10.1109/TIFS.2021. 3118879.

Ceballos, I.; Sharma, V.; Mugica, E.; Singh, A.; Roman, A.; Vepakomma, P.; and Raskar, R. 2020. SplitNN-driven Vertical Partitioning doi:10.48550/ARXIV.2008.04137. URL https://arxiv.org/abs/2008.04137.

Creswell, A.; White, T.; Dumoulin, V.; Arulkumaran, K.; Sengupta, B.; and Bharath, A. A. 2018. Generative Adversarial Networks: An Overview. IEEE Signal Processing Magazine 35(1): 53-65. doi:10.1109/MSP.2017.2765202.

Dwork, C. 2008. Differential Privacy: A Survey of Results. In Agrawal, M.; Du, D.; Duan, Z.; and Li, A., eds., Theory and Applications of Models of Computation, 1-19. Berlin, Heidelberg: Springer Berlin Heidelberg. ISBN 978-3-540-79228-4.

Hao Chen, Kim Laine, P. R. 2017. Fast Private Set Intersection from Homomorphic Encryption. 1243.

Kingma, D. P.; and Welling, M. 2014. Auto-Encoding Variational Bayes.

Lepoint, T.; Patel, S.; Raykova, M.; Seth, K.; and Trieu, N. 2021. Private Join and Compute from PIR with Default. 605.

Li, L.; Fan, Y.; Tse, M.; and Lin, K.-Y. 2020. A review of applications in federated learning. volume 149, 106854. ISSN 0360-8352. doi: https://doi.org/10.1016/j.cie. 2020.106854. URL https://www.sciencedirect.com/science/ article/pii/S0360835220305532.

Lin, Z.; Khetan, A.; Fanti, G.; and Oh, S. 2018. PacGAN: The power of two samples in generative adversarial networks. In Bengio, S.; Wallach, H.; Larochelle, H.; Grauman, K.; Cesa-Bianchi, N.; and Garnett, R., eds., Advances in Neural Information Processing Systems, vol. 31. Curran Associates, Inc. URL https://proceedings.neurips.cc/paper/2018/file/288cc0ff022877bd3df94bc9360b9c5d-Paper.pdf.

Liyue Fan., H. J. 2015. A Practical Framework for Privacy-Preserving Data Analytics. In WWW '15: Proceedings of the 24th International Conference on World Wide Web, 311-321. doi: https://doi.org/10.1145/2736277.2741122.

Park, N.; Mohammadi, M.; Gorde, K.; Jajodia, S.; Park, H.; and Kim, Y. 2018. Data synthesis based on generative adversarial networks. Proceedings of the VLDB Endowment 11(10): 1071-1083. doi:10.14778/3231751.3231757. URL https://doi.org/10.14778%2F3231751.3231757.

Polato, M. 2021. Federated Variational Autoencoder for Collaborative Filtering. In 2021 International Joint Conference on Neural Networks (IJCNN), 1-8. doi:10.1109/ IJCNN52387.2021.9533358.

Shokri, R.; Stronati, M.; Song, C.; and Shmatikov, V. 2016. Membership Inference Attacks against Machine Learning Models. arXiv. doi:10.48550/ARXIV.1610.05820. URL https://arxiv.org/abs/1610.05820.

Wu, Y.; Cai, S.; Xiao, X.; Chen, G.; and Ooi, B. C. 2020. Privacy preserving vertical federated learning for tree-based models. Proceedings of the VLDB Endowment 13(12): 2090-2103. doi:10.14778/3407790.3407811. URL https://doi.org/10.14778%2F3407790.3407811.

Xu, L.; Skoularidou, M.; Cuesta-Infante, A.; and Veeramachaneni, K. 2019. Modeling Tabular data using Conditional GAN. doi:10.48550/ARXIV.1907.00503. URL https://arxiv.org/abs/1907.00503.

Zhao, Z.; Kunar, A.; der Scheer, H. V.; Birke, R.; and Chen, L. Y. 2021. CTAB-GAN: Effective Table Data Synthesizing.

\* cited by examiner

| Number of Sandboxes 800 | KL Divergence 802 | Time Taken for Each Epoch (in s) 804 |
|---|---|---|
| 2 | 0.092 | 9.061 |
| 3 | 0.108 | 13.063 |
| 4 | 0.122 | 17.875 |

| GAN | | With | Without |
|---|---|---|---|
| | KLD | 0.11 | 0.13 |
| | DCR | 0.87 | 0.92 |
| | Model Efficacy | 0.86/87 | 0.85/0.86 |
| VAE | KLD | 0.27 | 0.3 |
| | DCR | 2.66 | 3 |
| | Model Efficacy | 0.60/0.67 | 0.64/0.67 |

902 →

| Sampling | KLD | DCR | Model Efficacy |
|---|---|---|---|
| Independent | 0.11 | 0.87 | 0.86/0.87 |
| Dependent | 0.12 | 1.07 | 0.85/0.85 |

*Fig. 9*

PROVIDING DATA COLLABORATION VIA A DISTRIBUTED SECURE COLLABORATION FRAMEWORK

BACKGROUND

Recent years have seen significant advancement in software platforms for data collaboration. For example, many data collaboration systems augment data with data gathered by other organizations. In particular, organizations hoping to improve their data insights share their data with other organizations and in turn also receive data from other organizations. In doing so, data collaboration systems stitch various datasets together to receive better insight into analytics and thus, decision making strategies. However, despite these advancements, data collaboration systems continue to suffer from a variety of problems with regard to sharing high-quality data, including inaccuracy of datasets, and data security.

SUMMARY

One or more embodiments described herein provide benefits and/or solve one or more of the problems in the art with systems, methods, and non-transitory computer-readable media that provide for data collaboration via a distributed and secure data collaboration framework that creates synthetic but statically similar data in a manner that does not share sensitive information between data collaborators. For example, the disclosed system utilizes local generators to generate features maps from data from individual data collaborators (e.g., local nodes). More specifically, local generators generate feature maps that are statistically representative of the datasets from the local nodes but that encode any sensitive information. The disclosed system then generates synthetic datasets from the feature maps utilizing a central generator. Moreover, the disclosed system, in generating synthetic datasets, not only creates representative datasets that capture the joint distribution of multiple input datasets, but does so without revealing personally identifiable information. Additionally, the disclosed system utilizes a distributed architectural setup, where raw information of the datasets on local nodes are not exposed to other computing devices.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 8 illustrates example experimental results of the scalability of the secure distributed data collaboration system in accordance with one or more embodiments;

FIG. 9 illustrates example tables of ablation studies for the secure distributed data collaboration system in accordance with one or more embodiments;

DETAILED DESCRIPTION

Figure 1:
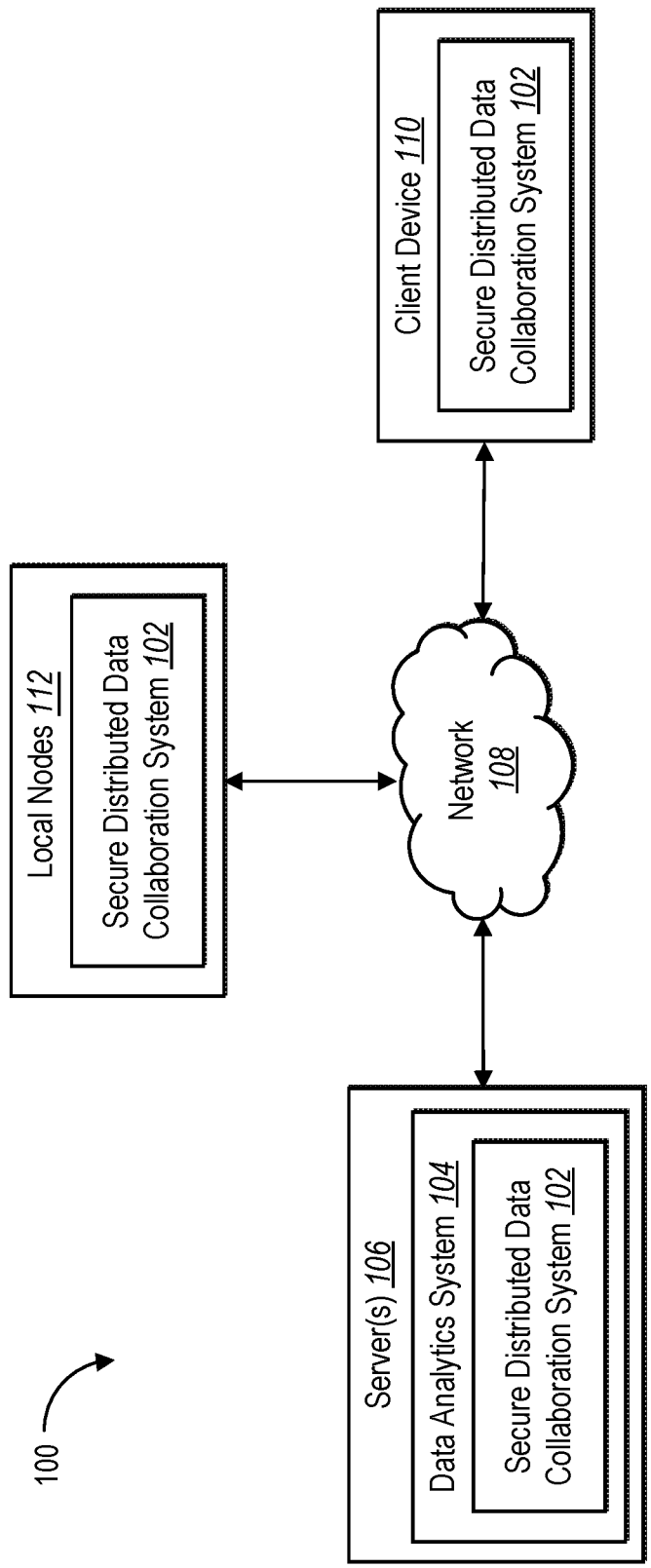
FIG. 1 illustrates an example environment in which a secure distributed data collaboration system operates in accordance with one or more embodiments.

One or more embodiments described herein include a method, systems, and non-transitory computer readable medium for implementing a secure distributed data collaboration system for generating synthetic data tables without exposing personally identifiable information from datasets to third-parties. For example, the secure distributed data collaboration system utilizes generative models to generate vertically partitioned datasets (e.g., partitioned columns) without exposing personally identifiable information. In particular, the secure distributed data collaboration system utilizes the vertically partitioned datasets to generate synthetic datasets that are statistically representative of the underlying data. The synthetic datasets then allow for the generation of analytic insights without exposing sensitive data.

For instance, the secure distributed data collaboration system sends a request to perform a data collaboration with a first dataset from a first local node and a second dataset from a second local node that both include personally identifiable information. Further, the secure distributed data collaboration system receives a first intermediate feature map that corresponds with the first dataset without personally identifiable information. The first local node generates the first intermediate feature map utilizing a local generator. The secure distributed data collaboration system also receives a second intermediate feature map that corresponds with the second dataset, also without personally identifiable information. The second local node generates the second intermediate feature map utilizing a local generator. The secure distributed data collaboration system generates a combined feature map of the first intermediate feature map and the second intermediate feature map. Moreover, from the combined feature map, the secure distributed data collaboration system generates a synthetic dataset which is statistically representative of the first dataset and the second dataset.

As just mentioned, the secure distributed data collaboration system generates the synthetic dataset which is statistically representative of the first and second dataset. Moreover, the secure distributed data collaboration system provides the synthetic dataset to a user corresponding to the data collaboration request. Specifically, the user corresponding to the data collaboration request utilizes the synthetic dataset for in-depth analytical insights. For instance, the user utilizing the synthetic dataset more accurately makes marketing decisions as the synthetic dataset is statistically representative of both the first dataset and the second dataset.

As also mentioned above, the secure distributed data collaboration system sends a request to perform a data collaboration. In response to sending a request, the secure distributed data collaboration system performs some pre-processing on the first dataset and the second dataset. In particular, the pre-processing allows the secure distributed data collaboration system to determine an overlap of users between the first dataset and the second dataset. Moreover, the secure distributed data collaboration system determines an overlap of users without the first local node or the second local node exposing any raw information of the datasets. For instance, the secure distributed data collaboration system utilizes a private set intersection model to determine an overlap between datasets.

As mentioned, the secure distributed data collaboration system sends a request to perform a data collaboration with a first dataset from a first local node and a second dataset from a second local node. In particular, the first local node and the second local node are remote devices from the central generative model. The central generative model receives and combines the intermediate feature maps representative of the first dataset and the second dataset. Moreover, the remote nature (e.g., distributed) of the first local node and the second local node, allows for sensitive information (e.g., personally identifiable information) to stay siloed at each local node, while still allowing for the sharing and generating of statistically representative datasets.

As mentioned, the secure distributed data collaboration system receives a first intermediate feature map and a second intermediate feature map. In particular, the secure distributed data collaboration system utilizes a transformer at each local node to transform columns of the datasets. For instance, the secure distributed data collaboration system utilizes transformers at each local node to transform discrete columns and continuous columns. Specifically, the secure distributed data collaboration system utilizes transformers of the local nodes to transform discrete columns ingo columns corresponding to a number of categories from the discrete columns. Furthermore, the secure distributed data collaboration system utilizes transformers of the local nodes to transform continuous columns to an approximate value column.

As mentioned above, the local nodes are remote from the central generative model. Although the local nodes are remote, the secure distributed data collaboration system trains the local nodes and the central generative model in a federated manner (e.g., distributed). For example, the secure distributed data collaboration system determines measures of loss for a first local generator, a second local generator, and the central generative model. In particular, the secure distributed data collaboration system then modifies parameters of the first local generator, the second local generator, and the central generative model based on the determined measures of loss.

As mentioned above, data collaboration systems suffer from a variety of problems. For example, due to an increase in strictness of privacy laws, data collaboration systems suffer from accurately sharing data with other organizations without compromising personally identifiable information. In particular, data collaboration systems typically utilize personally identifiable information to increase the quality of stitching data from different organizations together. For instance, without the personally identifiable information (e.g., due to privacy laws and general public sentiments around sharing private information), data collaboration systems share data that lacks meaningful insight for organizations to make informed decision.

Further, data collaboration systems attempt to utilize data sharing methods that involve withholding personally identifiable information. However, data collaboration systems utilizing these methods that attempt to withhold personally identifiable information typically suffer from only receiving very high-level information. As such, these methods utilized by data collaboration systems lack the depth and insight typically provided from datasets that include personally identifiable information. Accordingly, data collaboration systems continue to suffer from a lack of accurate and insightful data due to issues of personally identifiable information within data.

In addition to accuracy concerns, data collaboration systems also suffer from data security concerns. For example, data collaboration systems utilize a centralized architectural schemes for receiving data and generating data without personally identifiable information. However, due to the centralized setup of data collaboration systems, these systems potentially expose personally identifiable information to other devices and unwanted third-parties. For instance, data collaboration systems with centralized setups run the risk of data breaches that expose personally identifiable information from various organizations, thus potentially violating privacy-related laws.

The secure distributed data collaboration system provides several advantages over conventional data collaboration systems. In one or more embodiments, the secure distributed data collaboration system operates more accurately than conventional data collaboration systems. In particular, the secure distributed data collaboration system receives a first intermediate feature map corresponding with the first dataset and the second intermediate feature map corresponding with the second dataset to generate a combined feature map and then a synthetic dataset. Further, the synthetic dataset from the combined feature map is statistically representative of the first dataset and the second dataset. Accordingly, the secure distributed data collaboration system conforms with privacy laws by not compromising personally identifiable information while still generating synthetic datasets that are statistically representative of the first dataset and the second dataset. Thus, the secure distributed data collaboration system enables end-users utilizing the synthetic dataset to make meaningful determinations with the provided data. In particular, the secure distributed data collaboration system generating the synthetic dataset overcomes issues of only providing high-level information that lacks statistical depth. As such, the secure distributed data collaboration system improves upon accuracy in conventional systems.

In addition to the accuracy improvements, the secure distributed data collaboration system in one or more embodiments also improves upon data security of conventional data collaboration systems. For example, the secure distributed data collaboration system improves upon data security by receiving intermediate feature maps from local nodes and generating a synthetic dataset from the combined feature map utilizing a central generative model. In particular, the secure distributed data collaboration system implements a distributed architecture with local nodes and a central generator. In doing so, the secure distributed data collaboration system avoids issues regarding exposure of personally identifiable information to other devices and third-parties. Moreover, the secure distributed data collaboration system also avoids the risk of data breaches that expose personally identifiable information, which is a potential issue within centralized systems. Accordingly, the secure distributed data collaboration system improves upon data security issues prevalent within conventional data collaboration systems.

As illustrated by the foregoing discussion, the present disclosure utilizes a variety of terms to describe features and advantages of the secure distributed data collaboration system. Additional detail is now provided regarding the meaning of such terms. As mentioned above, the secure distributed data collaboration system sends a request to perform a data collaboration. For example, as used herein, the term "data collaboration" refers to a process of sharing data-related information. Further, data collaboration includes various computing devices from different organizations sharing data-related information. In particular, data collaboration further includes a computing device from a first organization receiving data-related information from a second organization. For instance, the computing device from the first organization sends a request to perform a data collaboration with another computing device from a second organization. Moreover, data collaboration assists organizations in improving decision making based on accurate data collaborations.

As also mentioned above, the secure distributed data collaboration system receives intermediate feature maps generated from datasets. For example, as used herein, the term "dataset" refers to a structured data organized according to specific categories. Moreover, datasets include various type of data such as text numbers, images, or videos. In particular, datasets typically include rows and columns. For instance, in datasets each row represents a single record (e.g., a single respondent, customer, or sampled individual) and each column represents a specific attribute or variable related to that record (e.g., name, gender, address, date of purchase, total purchases, etc.).

As mentioned above, the secure distributed data collaboration system receives the intermediate feature maps from the first local node and the second local node. As used herein, the term "first local node" and "second local node" refers to a first individual computing device and a second individual computing device. For example, the first local node and second local node both connect to a network. In particular, the first local node and the second local node act as both a client device and a server device. For instance, the first local node and the second local node are distributed devices (e.g., remote from the central generative model). Furthermore, the first local node and the second local node can store datasets with raw data that contains personally identifiable information without exposing the personally identifiable information (e.g., due to the remote nature of the local nodes).

As just mentioned, the datasets at the local nodes contain personally identifiable information. As used herein, the term "personally identifiable information" refers to information that can be used to identify an individual. For example, personally identifiable information includes information that directly or indirectly points to a particular individual. In particular, personally identifiable information includes information such as an individual's name, address, date of birth, email address, telephone number, financial information, medical information, biometric information, and other sensitive information. Moreover, raw information of datasets typically includes personally identifiable information.

As also mentioned above, the secure distributed data collaboration system utilizes a private set intersection model. As used herein, the term "private set intersection model" refers to a privacy-preserving computation to allow two or more organizations determine an overlap of their users within private datasets (e.g., a dataset containing personally identifiable information) without exposing the contents of the private datasets to each other or to third parties. For example, the private set intersection model determines whether an overlap of users exists between two or more datasets without revealing additional information.

As mentioned above, the secure distributed data collaboration system utilizes a central generative model to generate a synthetic dataset. As used herein, the term "central generative model" refers to generative model within a centralized server. For example, the secure distributed data collaboration system receives the combined feature map and utilizes the central generative model to generate a synthetic dataset. In particular, the central generative model stores and processes information (e.g., the combined feature map) at a single server. For instance, the secure distributed data collaboration system utilizes the central generative model to receive the intermediate feature maps from different local nodes to generate the synthetic dataset. However, raw information of datasets from the local nodes are not exposed to the central generative model, only representations of the dataset (e.g., the intermediate feature maps).

As mentioned above, the secure distributed data collaboration system utilizes local generators at the local nodes. As used herein, the term "local generator" refers to a model trained on data to generate new samples of data that are similar/representative of the initial samples of data. In contrast to the central generative model, the secure distributed data collaboration system trains the local generators locally on each local node without transferring raw data to the central generative model.

As used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data. To illustrate, a neural network can include, but is not limited to, a convolutional neural network (CNN), a residual learning neural network, a recurrent neural network (RNN), a generative adversarial neural network (GAN), a graph neural network (e.g., a graph convolutional neural network), a Region-CNN (R-CNN), a Faster R-CNN, a Mask R-CNN, single-shot detect (SSD) networks, etc.

As used herein, the term "neural network architecture" (or "architecture") refers to the structure of a neural network. In particular, a neural network architecture can refer to the structure of a neural network in its entirety or to the structure of a particular portion of the neural network. To illustrate, a neural network architecture can refer to the number of layers of a neural network and/or the type of one or more layers of the neural network.

Further, as also mentioned, the secure distributed data collaboration system also utilize transformers at the local nodes to transform datasets. As used herein, the term "transformer" refers to a type of neural network architecture. For example, a transformer utilizes a self-attention mechanisms that allows the model to weight the significance of different portions of input data. In particular, the transformer utilizes the self-attention mechanism to attend to different parts of the input sequence simultaneously. For instance, the transformer splits an input sequence into fixed-length segments mapped to a high-dimensional vector representation and feeds the vectors into a series of multi-headed attention and feedforward layers. Moreover, the secure distributed data collaboration system utilizes a transformer-generator combination to transform data and generate the intermediate feature maps.

As mentioned, the secure distributed data collaboration system receives intermediate feature maps from the local nodes. As used herein, the term "intermediate feature map" refers to a multi-dimensional array that represents the output of a model. For example, the intermediate feature map corresponds with a dataset generated at a local node. In particular, the secure distributed data collaboration system utilizes a local generator of a local node to generate the intermediate feature map from a dataset, where the intermediate feature map statistically represents the dataset. For instance, the secure distributed data collaboration system utilizes a transformer of the local node to transform various columns of the dataset and a generator to generate the intermediate feature map.

As mentioned previously, the secure distributed data collaboration system utilizes a transformer of the local node to transform discrete columns and continuous columns. As used herein, the term "discrete column" refers to a column within a dataset that includes data with a finite (countable) number of values. For example, discrete columns include distinct and separate values or categories that do not contain ranges. In particular, a discrete column can contain categories such as gender, number of people in a family, a number of employees, etc. As used herein, the term "continuous column" refers to a column within a dataset that includes data with a continuous range of values. For example, a continuous column includes data with an infinite number of possible values within a certain range. In particular, a continuous column includes data such as height, weight, temperature, and time. For instance, for a continuous column within a dataset that relates to weight within a certain population, the weight can take on any values within a certain range.

In one or more embodiments, the secure distributed data collaboration system utilizes a mixing matrix. As used herein, the term "mixing matrix" refers to a matrix for combining the first intermediate feature map and the second intermediate feature map. For example, the mixing matrix combines the intermediate feature maps and determines which features of an intermediate feature map should contribute to the combined feature map.

As mentioned, the secure distributed data collaboration system generates the combined map. As used herein, the term "combined feature map" refers to a combination of intermediate feature maps. For example, the secure distributed data collaboration system mixes the first intermediate feature map and the second intermediate feature map. In some instances, the secure distributed data collaboration system concatenates the first intermediate feature map and the second intermediate feature map.

As mentioned, the secure distributed data collaboration system generates synthetic datasets. As used herein, the term "synthetic dataset" refers to the secure distributed data collaboration system generating a dataset from a first intermediate feature map and a second intermediate feature map. For example, the secure distributed data collaboration system combines the first intermediate feature map and the second intermediate feature map to subsequently utilize the central generative model to generate the synthetic dataset. In particular, the secure distributed data collaboration system determines a correlation between various rows of the first intermediate feature map and various rows of the second intermediate feature map to generate the synthetic dataset.

Furthermore, the secure distributed data collaboration system in generating the synthetic dataset, generates a statistically representative dataset. As used herein, the term "statistically representative" refers to the synthetic dataset accurately capturing the statistical properties and relationships of the datasets that the synthetic dataset is intended to represent. For example, statistically representative includes accurately reflecting the distribution of characteristics in a dataset and capturing statistical properties such as correlations between variables, distribution of values, and various patterns in the dataset. Furthermore, statistically representative datasets include representative summary statistics such as mean and variance.

In one or more embodiments, the secure distributed data collaboration system utilizes conditional vector sampling. As used herein, the term "conditional vector sampling" refers to the secure distributed data collaboration system accounting for datasets with skewed category frequencies during training. For example, condition vector sampling refers to generating a sample vector from a dataset (e.g., a probability distribution) while conditioning on the value of other vectors. In particular, the condition vector sampling accounts for additional information such as imbalanced datasets. Moreover, during both training and inference, the secure distributed data collaboration system utilizes conditional vector sampling to generate synthetic datasets.

Additional detail regarding the secure distributed data collaboration system will now be provided with reference to the figures. For example, FIG. 1 illustrates a schematic diagram of an exemplary system environment 100 in which the secure distributed data collaboration system 102 operates. As illustrated in FIG. 1, the system environment 100 includes a server(s) 106, a data analytics system 104, a network 108, a client device 110, and local nodes 112.

Although the system environment 100 of FIG. 1 is depicted as having a particular number of components, the system environment 100 is capable of having any number of additional or alternative components (e.g., any number of servers, client devices, or other components in communication with the secure distributed data collaboration system 102 via the network 108). Similarly, although FIG. 1 illustrates a particular arrangement of the server(s) 106, the network 108, the client device 110, and the local nodes 112, various additional arrangements are possible.

The server(s) 106, the network 108, the client device 110, and the local nodes 112, are communicatively coupled with each other either directly or indirectly (e.g., through the network 108 discussed in greater detail below in relation to FIG. 12). Moreover, the server(s) 106, the client device 110, and the local nodes 112 include one or more of a variety of computing devices (including one or more computing devices as discussed in greater detail with relation to FIG. 12).

As mentioned above, the system environment 100 includes the server(s) 106. In one or more embodiments, the server(s) 106 send a request to perform a data collaboration, receives intermediate feature maps, generates a combined feature map, and generates a synthetic dataset. In one or more embodiments, the server(s) 106 comprises a data server. In some implementations, the server(s) 106 comprises a communication server or a web-hosting server.

In one or more embodiments, the client device 110 includes computing devices that are able to utilize the generated synthetic dataset to perform data analysis on the synthetic dataset. For example, the client device 110 includes smartphones, tablets, desktop computers, laptop computers, head-mounted-display devices, or other electronic devices. The client device 110 includes one or more applications for performing data analysis in accordance with the data analytics system 104. For example, in one or more embodiments, the client device 110 works in tandem with the secure distributed data collaboration system 102 to send data collaboration requests and generate synthetic datasets. Additionally, or alternatively, the client device 110 includes a software application hosted on the server(s) 106 which may be accessed by the client device 110 through another application, such as a web browser.

To provide an example implementation, in some embodiments, the secure distributed data collaboration system 102 on the server(s) 106 supports the secure distributed data collaboration system 102 on the client device 110 and the secure distributed data collaboration system on the local nodes 112. For instance, in some cases, the data analytics system 104 on the server(s) 106 gathers data for the secure distributed data collaboration system 102 (e.g., from the local nodes 112). The secure distributed data collaboration system 102 then, via the server(s) 106, provides the information to the client device 110. In other words, the client device 110 obtains (e.g., downloads) the secure distributed data collaboration system 102 from the server(s) 106. Once downloaded, the secure distributed data collaboration system 102 on the client device 110 provides access to generated synthetic datasets.

In alternative implementations, the secure distributed data collaboration system 102 includes a web hosting application that allows the client device 110 to interact with content and services hosted on the server(s) 106. To illustrate, in one or more implementations, the client device 110 accesses a software application supported by the server(s) 106. In response, the secure distributed data collaboration system 102 on the server(s) 106 receives an intermediate feature map from the local node 112, generates a synthetic dataset, and provides the synthetic dataset to the client device 110.

To illustrate, in some cases, the secure distributed data collaboration system 102 on the client device 110 sends data collaboration requests. The client device 110 transmits the request to the server(s) 106. In response, the secure distributed data collaboration system 102 on the server(s) 106 pings the local nodes 112 and receives intermediate feature maps from the local nodes 112. Furthermore, the secure distributed data collaboration system 102 on the server(s) 106 generates a synthetic dataset. Moreover, the secure distributed data collaboration system then provides the generated synthetic dataset to the client device 110.

Indeed, the secure distributed data collaboration system 102 is able to be implemented in whole, or in part, by the individual elements of the system environment 100. For instance, although FIG. 1 illustrates the secure distributed data collaboration system 102 implemented with regard to the server(s) 106, different components of the secure distributed data collaboration system 102 are able to be implemented by a variety of devices within the system environment 100. For example, one or more (or all) components of the secure distributed data collaboration system 102 are implemented by a different computing device (e.g., the client device 110) or a separate server from the server(s) 106. Indeed, as shown in FIG. 1, the client device 110 includes the secure distributed data collaboration system 102. Example components of the secure distributed data collaboration system 102 will be described below with regard to FIG. 12.

Figure 2:
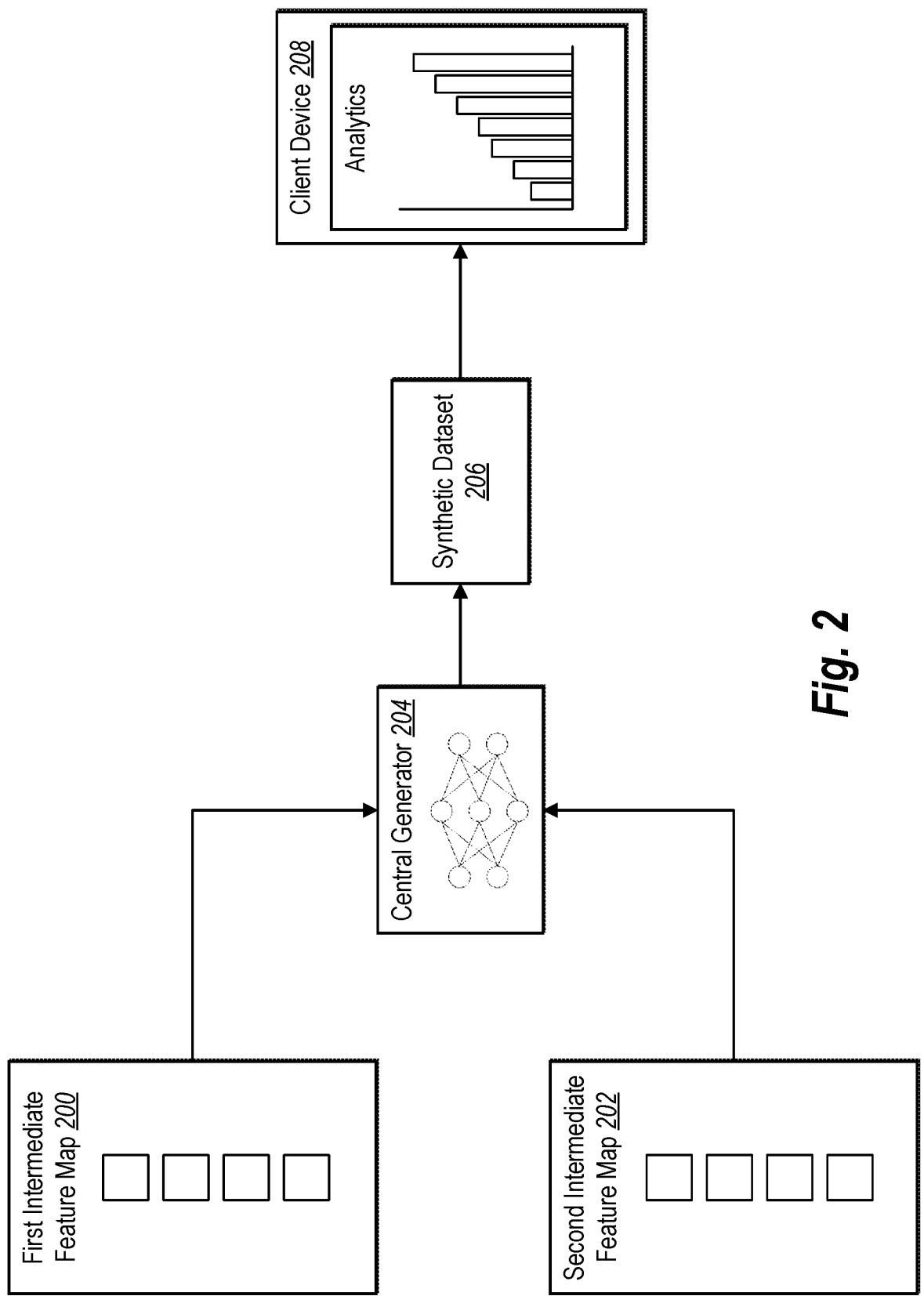
FIG. 2 illustrates an overview of the secure distributed data collaboration system generating a synthetic dataset in accordance with one or more embodiments.

FIG. 2 illustrates an overview of the secure distributed data collaboration system 102 providing a synthetic dataset to a client device in accordance with one or more embodiments. For example, FIG. 2 illustrates the secure distributed data collaboration system 102 receiving a first intermediate feature map 200 and a second intermediate feature map 202. Moreover, as also mentioned, the first intermediate feature map 200 and the second intermediate feature map 202 originate from a first local node and a second local node. Additional details relating to local nodes generating the first intermediate feature map 200 and the second intermediate feature map 202 and the secure distributed data collaboration system 102 receiving the generated intermediate feature maps is given below in the description of FIGS. 3A-3B.

As also discussed above, the secure distributed data collaboration system 102 utilizes the central generative model 204 to generate a synthetic dataset 206. For example, as discussed, the secure distributed data collaboration system 102 generates the synthetic dataset 206 based on the first intermediate feature map 200 and the second intermediate feature map 202. Additional details relating to the utilizing the synthetic dataset 206 to train the central generative model 204 and local generators is given below in the description of FIGS. 4A-4B.

As also discussed, the secure distributed data collaboration system 102 generates the synthetic dataset 206 and provides the synthetic dataset 206 to a client device 208. For example, as already discussed, the client device 208 corresponds with a request sent from the secure distributed data collaboration system 102 to perform a data collaboration with one or more local nodes. In response to the request, the secure distributed data collaboration system 102 sends the synthetic dataset 206 to the client device 208, which is able to make additional analytical insight based on the provided synthetic dataset 206. Additional details regarding the client device 208 sending data collaboration requests, configuration of data collaboration requests, and the secure distributed data collaboration system 102 providing the synthetic dataset 206 is provided below in the description of FIGS. 5A-5C.

In one or more embodiments, prior to the secure distributed data collaboration system 102 receiving the first intermediate feature map 200 and the second intermediate feature map 202, the secure distributed data collaboration system 102 utilizes a private set intersection model. For example, the secure distributed data collaboration system 102 utilizes the first local node which includes the first dataset and the second local node which includes the second dataset, to determine an overlap of users between the first dataset and the second dataset. In particular, the secure distributed data collaboration system 102 utilizes the private set intersection to find an intersection of users between both datasets without sharing raw data with a third party. For instance, the secure distributed data collaboration system 102 implements the methods described in Hao Chen, Kim Laine, P. R. 2017. *Fast Private Set Intersection from Homomorphic Encryption.* 1243 (https://eprint.iacr.org/2017/299), which is incorporated by reference herein in its entirety.

As mentioned above, FIG. 3A provides additional architectural details of the secure distributed data collaboration system 102 generating a synthetic dataset in accordance with one or more embodiments. Several of the components shown in FIG. 3A were already discussed above. For example, FIG. 3A shows a first local node 300 which includes a first dataset 302 and a second local node 304 which includes a second dataset 306, which were discussed above.

Figure 3A:
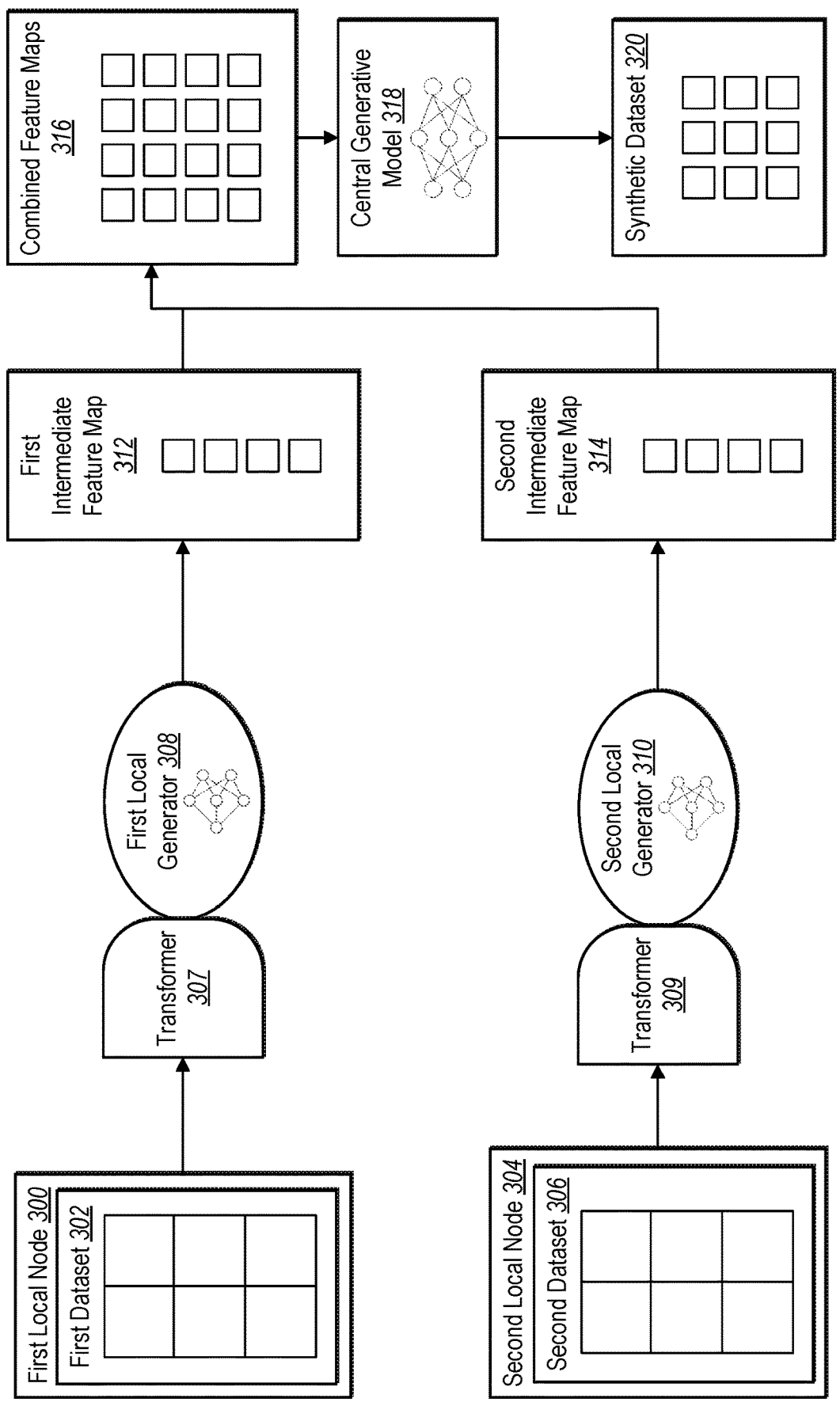
FIG. 3A illustrates a diagram of additional architectural details of the secure distributed data collaboration system generating a synthetic dataset in accordance with one or more embodiments.

Further, FIG. 3A shows the secure distributed data collaboration system 102 utilizing a transformer 307 and a first local generator 308 of the first local node 300 to generate a first intermediate feature map 312. Additionally, FIG. 3A also shows the secure distributed data collaboration system 102 utilizing a transformer 309 and a second local generator 310 of the second local node 304 to generate a second intermediate feature map 314. In addition to the already discussed details, the transformers and generators generate the first intermediate feature map 312 and the second intermediate feature map 314 by transforming discrete columns of the first dataset 302 and the second dataset 306. In particular, the secure distributed data collaboration system 102 utilizes the transformer 307 to transform a first discrete column of the first dataset 302 to columns corresponding to a number of categories of the first discrete column of the first dataset 302. Additionally, the secure distributed data collaboration system 102 utilizes the transformer 309 to transform a first discrete column of the second dataset 306 to columns corresponding to a number of categories of the first discrete column of the second dataset 306.

To illustrate, in one or more embodiments, the first discrete column of the first dataset 302 relates to gender. In particular, the first discrete column relating to gender contains three categories: male, female, and other. Moreover, based on the first discrete column of the first dataset containing three categories, the transformer 307 transforms the first discrete column of the first dataset 302 into three separate columns. Furthermore, in one or more embodiments, the first discrete column of the second dataset 306 relates to number of children in a household. In particular, the first discrete column of the second dataset 306 relating to number of children in a household contains 5 children, 4 children, 3 children, 2 children, 1 child, and 0 children. Based on the first discrete column of the second dataset 306 containing six categories, the secure distributed data collaboration system 102 utilizes the transformer 309 to transform the first discrete column of the second dataset 306 into six separate columns. Moreover, the secure distributed data collaboration system 102 utilizes the transformer 307 and the transformer 309 to transform discrete columns with one hot encoding.

In addition to the secure distributed data collaboration system 102 utilizing transformer 307 and the transformer 309 to transform discrete columns of the datasets, in one or more embodiments, the transformer 307 and the transformer 309 transforms continuous columns. For example, the secure distributed data collaboration system 102 utilizes the transformer 307 to transform a first continuous column of the first dataset 302. The secure distributed data collaboration system 102 utilizes the transformer 309 to transform a first continuous column of the second dataset 306. In particular, the secure distributed data collaboration system 102 transforms the continuous columns to approximate value columns. For instance, the secure distributed data collaboration system 102 transforms the first continuous column of the first dataset 302 by determining a difference between a first probability distribution statistic and each value of the first continuous column of the first dataset 302. For the first continuous column of the second dataset 306 the secure distributed data collaboration system 102 determines a difference between a second probability distribution statistic and each value of the first continuous column of the second dataset 306.

To illustrate, in one or more embodiments, the secure distributed data collaboration system 102 utilizes the transformer 307 and the transformer 309 to transform continuous columns with a Bayesian Gaussian Mixture Model (BayesGMM). For example, the secure distributed data collaboration system 102 utilizes the methods described in Kingma, D. P.; and Welling, M. 2014. *Auto-Encoding Variational Bayes* (https://arxiv.org/abs/1312.6114), which is incorporated by reference herein in its entirety. In particular, the secure distributed data collaboration system 102 utilizes a BayesGMM-transformer from a synthetic data vault library (e.g., sdv) to approximate each value in the approximate values columns. For instance, the secure distributed data collaboration system 102 utilizes the BayesGMM-transformer to approximate each value by storing the difference between the nearest Gaussian Mixture Model (GMM) mode and an individual value of the continuous column. Specifically, the secure distributed data collaboration system 102 utilizing BayesGMM-transformer improves handling of multi-modal continuous distributions.

Thus, the secure distributed data collaboration system 102 utilizes the transformer 307 and the transformer 309 to learn contextual relationships between the columns of the datasets. The secure distributed data collaboration system 102 subsequently passes the learned representation to the first local generator 308 and the second local generator 310. In some embodiments the secure distributed data collaboration system 102 implements the first local generator 308 and the second local generator 310 as a generative adversarial neural network (GAN). In particular, the secure distributed data collaboration system 102 utilizes a conditional GAN based architecture.

For embodiments where the secure distributed data collaboration system 102 implements GAN, the first local generator 308 and the second local generator 310 contain two fully-connected hidden layers. Moreover, the secure distributed data collaboration system 102 utilizes batch-normalization and a ReLU activation function. Additionally, the secure distributed data collaboration system 102 utilizes the first local generator 308 and the second local generator 310 to transform an output into a vector size of 256 by utilizing a fully connected layer. Moreover, the secure distributed data collaboration system 102 also passes a conditional sampling vector to both the first local generator 308 and the second local generator 310 (for both training and inference). More details relating the conditional sampling vectors is given below in the description of FIG. 3B.

FIG. 3A also shows the secure distributed data collaboration system 102 generating a combined feature map 316 from the first intermediate feature map 312 and the second intermediate feature map 314. For example, the secure distributed data collaboration system 102 generates the combined feature map 316 by utilizing a mixing layer, as discussed above. In particular, the secure distributed data collaboration system 102 concatenates the first intermediate feature map 312 and the second intermediate feature map 314 utilizing the mixing layer to improve the quality of data stitching. For instance, the secure distributed data collaboration system 102 utilizes a mixing matrix to mix the first intermediate feature map 312 and the second intermediate feature map 314.

Furthermore, FIG. 3A shows the secure distributed data collaboration system 102 processing the combined feature map 316 with a central generative model 318. For example, the secure distributed data collaboration system 102 utilizes the central generative model 318 that includes fully-connected hidden layers. In particular, in one or more embodiments, the secure distributed data collaboration system 102 utilizes the central generative model 318 with four fully-connected hidden layers along with batch normalization and a ReLU activation after every two fully connected layers. Similar to the secure distributed data collaboration system 102 utilizing the first local generator 308 and the second local generator 310, in some embodiments, the secure distributed data collaboration system 102 implements GAN as the central generative model 318. In some instances, the secure distributed data collaboration system 102 utilizes conditional GAN for the central generative model 318. Furthermore, FIG. 3A also shows the secure distributed data collaboration system 102 generating the synthetic dataset 320 utilizing the central generative model 318.

In one or more embodiments, the secure distributed data collaboration system 102 utilizes the following GAN architecture which is representative of the above discussion:

---
h0 = z ⊕ cond
h1 = h0 ⊕ ReLU(BN(FC|cond|+|z|→256(h0)))
h2 = h1 ⊕ ReLU(BN(FC|cond|+|z|+256→256(h0)))
h3 = FC|cond|+z+512→256(h2)
h4 = FC$_{n*256 \to n*256}$(h 1/3 ⊕ h 2/3 ⊕ ... ⊕ h n/3)
h5 = h4⊕ReLU(BN(FC256→256(BN(FCn*256→256(h4))))
h6 = h5⊕ReLU(BN(FC256→256(BN(FCn*256+256→256(h5)))))
h7 = FC$_{n+256+512}$→ Σ$_{(|cond|+|z|)}$(h6)
h8 = FC Σ(|cond|+|z|)→|cond|+|z|
α = tanh(h8)
β = gumbel(h8)
d = gumbel(h8)
h9 = r1 ⊕ ... ⊕ r10 ⊕ cond1 ⊕ ... ⊕ cond10
h10 = drop(leaky(FC10|r|+10|cond|→256(h9)))
h11 = drop(leaky(FC256→256(h10)))
C = FC256→1(h11)
---

The following explains various notations utilized in the above architecture. For the above architecture, the x1⊕x2 indicates a concatenation of vectors x1 and x2. $FC_{x \to y}$ indicates a fully connected linear layer with input dimension x and output dimension y. BN indicates applying a batch normalization layer. ReLU indicates applying a ReLU activation. Leaky indicates applying a Leaky ReLU activation. Drop indicates applying a dropout layer. Gumbel indicates applying a gumbel softmax activation. Tan h indicates applying a tan h activation.

In addition to the above, in some embodiments, the secure distributed data collaboration system 102 implements the first local generator 308, the second local generator 310, and the central generative model 318 as a variational autoencoder (VAE). In particular, the secure distributed data collaboration system 102 utilizes a conditional VAE architecture in a decentralized setup. Furthermore, similar to the above discussion, the secure distributed data collaboration system 102 utilizes the VAE architecture independently at each local node.

Based on the above VAE implementation, the secure distributed data collaboration system 102 contains local encoders, central encoders, and central decoders. In regard to the local encoders (similar to above), the secure distributed data collaboration system 102 utilizes the local encoders to transform input data (e.g., datasets) along with conditional vectors (described below in FIG. 3B) to intermediate feature maps at each individual local node.

Furthermore, for the VAE implementation for central encoders, the secure distributed data collaboration system 102 utilizes the central encoders to take the intermediate feature maps from the local encoders and transform them into latent representations. For instance, for the central encoders, the secure distributed data collaboration system 102 keeps layer $h_3$ at the start of the central encoder as non-trainable. The secure distributed data collaboration system 102 keeps layer $h_3$ as non-trainable to prevent a situation where the data distribution from each local client is learned individually but joint data distribution of the whole data present among the local nodes is not learned.

Moreover, for the VAE implementation for central decoders, the secure distributed data collaboration system 102 utilizes the central decoders to partially reconstruct input data. In particular, the secure distributed data collaboration system 102 utilizes mu and std from the central encoders to sample a latent vector. Further, the secure distributed data collaboration system 102 utilizes the central decoders to take the latent vector and the same conditional vectors at the local encoders to partially reconstruct the input data.

In one or more embodiments, the secure distributed data collaboration system 102 utilizes the following VAE architecture which is representative of the above discussion:

---
Local Encoder
h0 = x ⊕ cond
h1 = ReLU(FC|cond|+|x|→|cond|+|x|(h0))
h2 = ReLU(FC|cond|+|x|→96(h1))
Central Encoder
h3 = ReLU(FCn*96→Σ$_{i=1}^{n}$(|cond| + |x|)(h2))
h4 = ReLU(FCΣ$_{i=1}^{n}$(|cond| + |x|) → 256 (h3))
h5 = ReLU(FC256→256(h4))
h6 = ReLU(FC256→256(h5))
mu = FC256→512(h6))
std = exp (0.5 * FC256→512(h6)
emb = mu + std * eps, eps ~ N(0, 1)
Central Decoder
h7 = ReLU(FC512→256(emb))
h8 = ReLU(FC256→256(h7))
h9 = ReLU(FC256→256(h8))
Local Decoder
h10 = ReLU(FC$_{256 \to |cond|+|x|}$(h9))
h11 = ReLU(FC|cond|+|x|→|cond|+|x|(h10))
---

As mentioned above, FIG. 3B illustrates an example of conditional vector sampling in accordance with one or more embodiments. For example, GANs or VAEs perform poorly on imbalanced datasets due to GANS and VAEs not receiving sufficient training on recessive or merely represented classes. As such, GANS or VAEs on imbalanced datasets typically do not learn distributions very well. In particular, the secure distributed data collaboration system 102 rectifies issues of imbalanced datasets by utilizing conditional vector sampling for training the conditional GAN. For instance, the secure distributed data collaboration system 102 samples the condition with log frequency ratio of original occurrences of class. Accordingly, utilizing log frequency of cardinality of each category in a discrete attribute during training assists a model in learning merely represented categorical classes well. As such, the GAN model receives enough exposure to merely represented classes by utilizing conditional vector sampling. Importantly, the secure distributed data collaboration system 102 utilizes conditional vector sampling for both inference and training.

Similarly for VAE, the secure distributed data collaboration system 102 also utilizes conditional vector sampling. In particular, the secure distributed data collaboration system 102 appends to the input data fed to each local encoder in VAE a conditional vector sample.

In one or more embodiments, the secure distributed data collaboration system 102 utilizes in addition to the conditional vector sampling a mask vector. In particular, the mask vector indicates the discrete category currently represented in a conditional vector. Further, the secure distributed data collaboration system 102 maintains a matrix mat. For example, for matrix mat [discrete column d][category c], each entry is a list of all indices having category c in discrete column d.

Figure 3B:
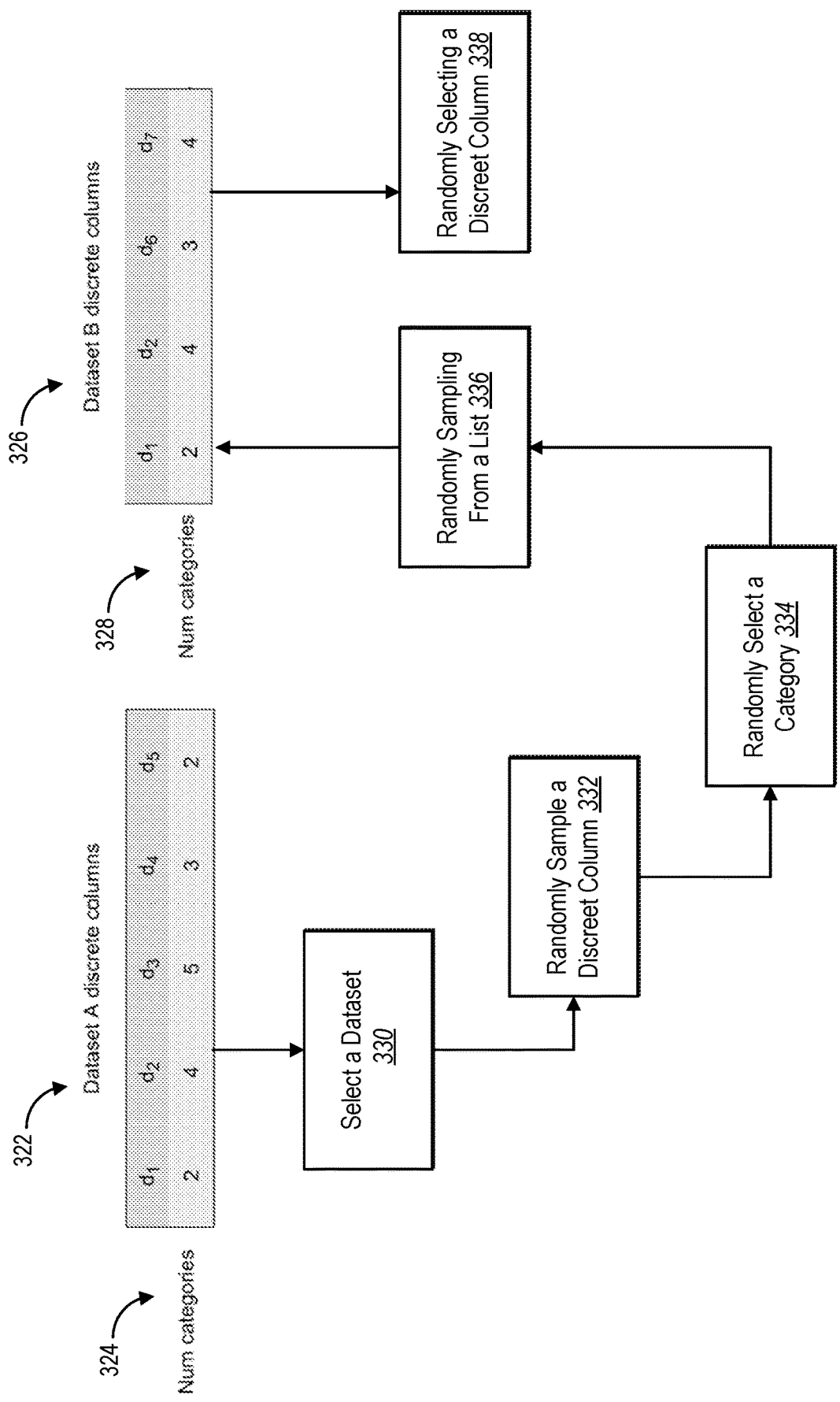
FIG. 3B illustrates a diagram of the secure distributed data collaboration system utilizing conditional vector sampling in accordance with one or more embodiments.

As mentioned, FIG. 3B illustrates conditional vector sampling. For example, FIG. 3B shows discrete columns 322 for dataset A. In particular, the discrete columns 322 for dataset A includes {d1, d2, d3, d3, d5.}. Further, FIG. 3B also indicates a number of categories 324. For instance, column d1 has two categories, d2 has four categories, d3 has five categories, d4 has three categories, and d5 has 2 categories. Additionally, FIG. 3B also shows discrete columns 326 for dataset B. In particular, the discrete columns 326 for dataset B includes {d1, d2, d6, d7.}. Further, for a number of categories 328, FIG. 3B shows column d6 has three categories, and d7 has four categories.

FIG. 3B further illustrates a series of steps for performing conditional vector sampling. For the series of steps, the secure distributed data collaboration system 102 performs a first act 330 of selecting a dataset from a local node. The first act 330 includes selecting a dataset from a local node to first sample the conditional vector and then correspondingly sampling a conditional vector for the other local node. Specifically, in one or more embodiments the first act 330 includes selecting dataset A.

Further, FIG. 3B shows an act 332 of randomly sampling a discrete column. For example, since dataset A was selected in the act 330, the act 332 includes sampling a random discrete column d from {d1, d2, d3, d3, d5.}. For instance, the secure distributed data collaboration system 102 in performing act 332 randomly selects discrete column d3. Moreover, as mentioned above, the secure distributed data collaboration system 102 would also generate a mask vector representing the randomly selected discrete column d3. For instance, the mask vector representing d3 would include [0,0,1,0,0] (whereas, if d5 was randomly selected the mask vector would be [0,0,0,0,1].

Moreover, FIG. 3B shows an act 334 of randomly selecting a category from the selected discrete column. For example, since discrete column d3 was selected in the act 332, the act 334 selects from one of the five categories of d3. In particular, discrete column d3 includes categories {c1, c2, c3} with corresponding frequency {f1, f2, f3}. Furthermore, each category includes a respective probability weight of {log(f1), log(f2), log(f3)}. For instance, the act 334 results in the selection of category c2, which the secure distributed data collaboration system 102 utilizes as the conditional vector for dataset A.

Additionally, FIG. 3B shows an act 336 of randomly sampling from a list given by mat [discrete column d][category c2]. For example, the secure distributed data collaboration system 102 passes the random sampling from list mat [discrete column d][category c2] to pass to dataset B. In particular, the value passed to dataset B is val. Moreover, FIG. 3B shows an act 338 of randomly selecting a discrete column from dataset B. In particular, the local node for dataset B receives the index value val which indicates data row data [val]. For the act 338, the secure distributed data collaboration system 102 randomly selects one of the discrete columns from dataset B {d1, d2, d6, d7.}. For instance, the act 338 selects d6 which results in a mask vector for dataset B of [0,0,1,0]. Similar to above, the secure distributed data collaboration system 102 selects a category based on whichever data [val] row has an entry in the d6 column. For instance, if the category in the d6 column of data [val] row is c1, then the secure distributed data collaboration system 102 utilizes c1 as the condition vector for passing through local generator (corresponding to dataset B).

Figure 4A:
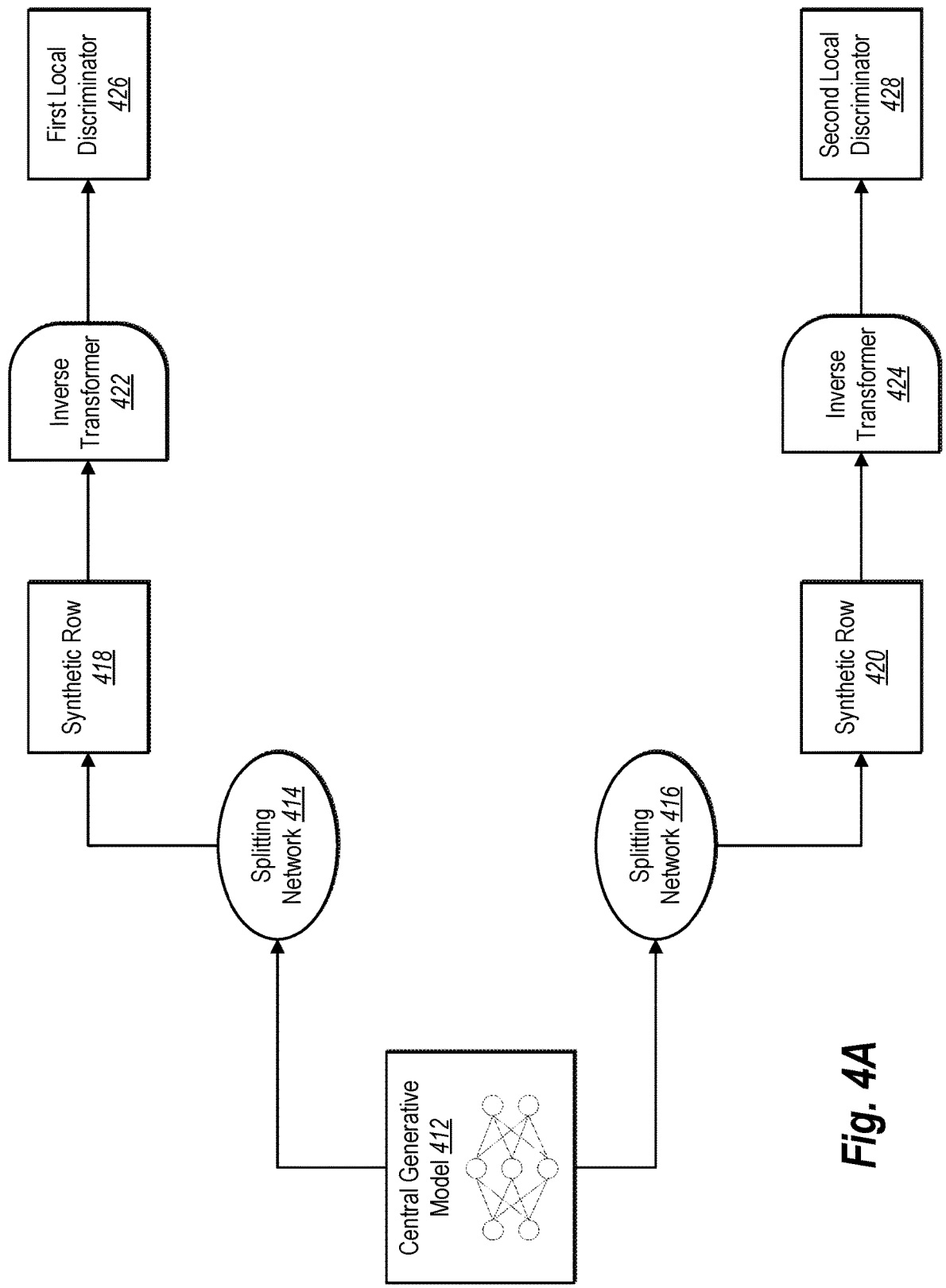
FIG. 4A illustrates a diagram of the secure distributed data collaboration system passing synthetic rows to local discriminators in accordance with one or more embodiments.

FIG. 4A illustrates details of the secure distributed data collaboration system 102 passing synthetic rows of a generated synthetic dataset to local discriminators of the local nodes in accordance with one or more embodiments. Further, as discussed, the secure distributed data collaboration system 102 utilizes a central generative model 412 to process a combined feature map to generate a synthetic dataset.

In addition, FIG. 4A shows the secure distributed data collaboration system 102 utilizing a splitting network 414 and a splitting network 416. For example, the secure distributed data collaboration system 102 utilizes the splitting network 414 and the splitting network 416 to split a synthetic row to pass to the local nodes. In particular, the secure distributed data collaboration system 102 passes the synthetic dataset generated from the central generative model 412 through a linear trainable layer (e.g., the splitting networks). Further, the secure distributed data collaboration system 102 utilizes the linear trainable layer to extract information regarding the columns of the synthetic dataset corresponding to individual datasets (e.g., the first dataset and the second dataset). Specifically, the secure distributed data collaboration system 102 utilizes the splitting networks to extract an output of the size |cond|+|z| from the $h_6$ of the linear trainable layer. Moreover, the secure distributed data collaboration system 102 then applies a mix activation function to generate a synthetic row representation. To illustrate, the secure distributed data collaboration system 102 generates scalar values α by tan h and the secure distributed data collaboration system 102 further generates the mode indicator β and discrete values d utilizing gumbel softmax.

As further shown, the secure distributed data collaboration system 102 utilizes the splitting network 414 to extract a synthetic row 418 and the splitting network 416 to extract a synthetic row 420. For example, the secure distributed data collaboration system 102 utilizes the splitting network 414 and the splitting network 416 to split the synthetic dataset to send to each individual local node. In particular, the secure distributed data collaboration system 102 utilizes the splitting network 414 to split the synthetic dataset for the first local node and utilizes the splitting network 416 to split the synthetic dataset for the second local node.

Moreover, the secure distributed data collaboration system 102 utilizes inverse transformers at each local node. For example, the secure distributed data collaboration system 102 utilizes an inverse transformer 422 for the first local node to transform the synthetic row 418. Further, the secure distributed data collaboration system 102 utilizes an inverse transformer 424 for the second local node to transform the synthetic row 420. Specifically, the secure distributed data collaboration system 102 then passes the transformed rows to the discriminators of the local nodes. For instance, the secure distributed data collaboration system 102 receives via a first local discriminator 426 a first transformed synthetic row and receives via a second local discriminator 428 a second transformed synthetic row.

In one or more embodiments, the secure distributed data collaboration system 102 implements a PacGAN framework for the local discriminators. In particular, the secure distributed data collaboration system 102 implements the PacGAN framework with 10 samples in each pac to prevent mode collapse and includes a series of linear, leaky ReLU, and dropout layers. For instance, the architectural structure described in Lin, Z.; Khetan, A.; Fanti, G.; and Oh, S. 2018. PacGAN: The power of two samples in generative adversarial networks. In Bengio, S.; Wallach, H.; Larochelle, H.; Grauman, K.; Cesa-Bianchi, N.; and Garnett, R., eds., Advances in Neural Information Processing Systems, volume 31. Curran Associates, Inc. URL https://proceedings-.neurips.cc/paper/2018/file/
288cc0ff022877bd3df94bc9360b9c5d-Paper.pdf, which is incorporated by reference herein in its entirety.

Figure 4B:
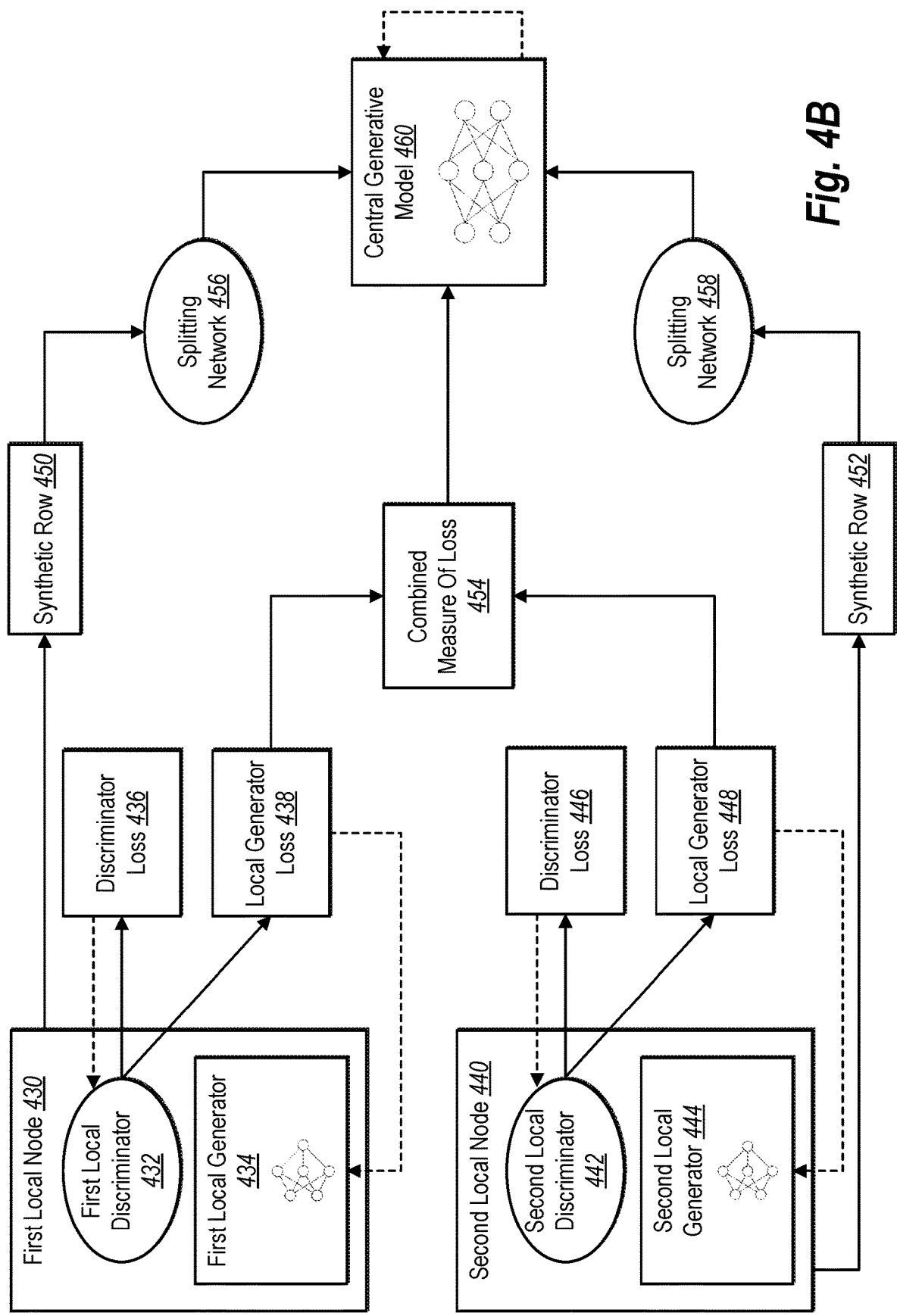
FIG. 4B illustrates a diagram of the secure distributed data collaboration system back-propagating measures of loss in accordance with one or more embodiments.

FIG. 4B illustrates the secure distributed data collaboration system 102 updating parameters of various models based on determining measures of loss. For example, FIG. 4B shows the secure distributed data collaboration system 102 determining a local generator loss 438 and a local generator loss 448. In particular, the secure distributed data collaboration system 102 back-propagates the local generator loss 438 to a first local generator 434. Further, the secure distributed data collaboration system 102 back-propagates the local generator loss 448 to a second local generator 444.

In one or more embodiments, the secure distributed data collaboration system 102 utilizes a loss function that includes an L1 (least absolute deviations) loss function, an L2 (least square errors) loss function, mean squared error loss function, mean absolute error loss function, Huber loss function, and cross-entropy loss function. In some instances, the secure distributed data collaboration system 102 utilizes condition loss for the local generators. For example, the secure distributed data collaboration system 102 utilizes the following condition loss:

$$LCondL = CE(\text{transformed data}, \text{mask}, \text{condition})$$

In particular, the above condition loss indicates that CE( ) returns the Cross Entropy Loss based on whether transformed data has a correct condition in relation to the chosen attribute through the mask.

FIG. 4B shows the secure distributed data collaboration system 102 utilizing a first local discriminator 432 of a first local node 430 to determine a discriminator loss 436. Further, FIG. 4B also shows the secure distributed data collaboration system 102 utilizing a second local discriminator 442 of a second local node 440 to determine a discriminator loss 446. As used herein, the term "discriminator loss" refers to the quality in which a discriminator is distinguishing between real and fake data. For example, the secure distributed data collaboration system 102 determines discriminator loss by determining a difference between the discriminator's output for real data and the discriminator's output for fake data produced by a generator. In particular, the secure distributed data collaboration system 102 updates parameters of the discriminator based on the discriminator loss to improve the discriminator's ability to distinguish between real and fake data. Accordingly, as shown, the secure distributed data collaboration system 102 updates the first local discriminator 432 with the discriminator loss 436 and updates the second local discriminator 442 with the discriminator loss 446.

For example, the secure distributed data collaboration system 102 utilizes WGAN loss. In particular for the discriminator loss 436 and the discriminator loss 446, the secure distributed data collaboration system 102 utilizes discriminator loss with gradient penalty. To illustrate, the following shows the discriminator loss:

$$L_D = E_{\hat{x} \sim P_g}[D(\hat{x})] - E_{\hat{x} \sim P_r}[D(x)] + \lambda E_{\hat{x} \sim P_{\hat{x}}}[(\|\nabla_{\hat{x}} D(\hat{x})\|_2 - 1)_2]$$

In one or more embodiments for the discriminator loss, the secure distributed data collaboration system 102 implements the methods described in Arjovsky, M.; Chintala, S.; and Bottou, L. 2017. Wasserstein Generative Adversarial Networks. In Precup, D.; and Teh, Y. W., eds., Proceedings of the 34th International Conference on Machine Learning, volume 70 of Proceedings of Machine Learning Research, 214-223. PMLR. URL https://proceedings.mlr.press/v70/arjovsky17a.html, which is incorporated by reference herein in its entirety.

As further shown in FIG. 4B, the secure distributed data collaboration system 102 utilizes the first local node 430 to pass a synthetic row 450 to a splitting network 456 and the second local node 440 to pass a synthetic row 452 to a splitting network 458. In particular, the secure distributed data collaboration system 102 inverse transforms the continuous columns of synthetic rows to pass them back to a central generative model 460. Further, the secure distributed data collaboration system 102 determines a MSE loss between common columns of the synthetic data to promote efficient stitching of the data. To illustrate, the secure distributed data collaboration system 102 determines the MSE loss with:

$$L_{MSE} = f^{-1}_{transformerA}(c1_{genA}) - f^{-1}_{transformerB}(c1_{genB}))^2$$

Specifically, $f^{-1}(x)$ indicates the inverse transformed version of c1 columns and $c1_{gen x}$ indicates the synthetically generated transformed row in local setup X.

Moreover, as shown in FIG. 4B, the secure distributed data collaboration system 102 combines the local generator loss 438 and the local generator loss 448 to generate a combined measure of loss 454. Furthermore, as mentioned above, the secure distributed data collaboration system 102 utilizes the aforementioned MSE loss between a set of attributes common to the first dataset of the first local node 430 and the second dataset of the second local node 440 with the combined measure of loss 454. In particular, the secure distributed data collaboration system 102 determines a total measure of loss from the combined measure of loss 454 and the MSE loss. Moreover, the secure distributed data collaboration system 102 modifies parameters of the central generative model 460 based on a determined total measure of loss (e.g., the combined measure of loss 454 plus the determined MSE loss).

In one or more embodiments, the secure distributed data collaboration system 102 utilizes hinge loss and MSE loss. In particular, the secure distributed data collaboration system 102 utilizes hinge loss for the local generator losses and MSE loss to implement a securely trained framework. To illustrate:

$$Lhinge = \max(L - k, 0)$$

In the above equation, the secure distributed data collaboration system 102 determines the kink point based on the level of security required.

For example, the secure distributed data collaboration system 102 trains an implementation of GAN, utilizing the following algorithm:

---
Algorithm 1: GAN training for $k_{th}$ local setup
---
Input: Pre-processed data from individual servers
Output: Synthetic joined Data
1 for iteration i= 1 to NoOfEpochs do
2 # Local Setup                                              end
3 $C_k$ ←SampleCondVec( );
4 $N_k$ ←SampleNoise( );
5 $Z_k$ ←$N_k$ ⊕ $C_k$;
6 $I_k$ ←LocalGenerator($Z_k$);
7 # Central Setup
8 I ←$I_1$ ⊕ $I_2$ ⊕ ... ⊕ $I_n$
9 M ←MixMatch(I);
10 G ←Central Generator(M);
11 # Local Setup
12 $S_k$ ← SplittingNetwork(G);
13 $D_k$ ← Discriminator($S_k$);
14 d ←CalculatePenalty($D_k$);
15 DiscriminatorBackProp( );
16 # Central Setup
17 mse ←CalculateMSE( );
18 GeneratorBackProp( );
---

Similar to previous discussions, in one or more embodiments, the secure distributed data collaboration system 102 implements VAE architecture. For example, in implementing VAE architecture, the secure distributed data collaboration system 102 undergoes VAE training. In particular, similar to the above, the secure distributed data collaboration system 102 determines reconstruction loss, Kullback-Leibler divergence (e.g., KL divergence) and conditional losses to pass these losses to the central generative model 460.

In one or more embodiments, the secure distributed data collaboration system 102 utilizes the VAE architecture to determine a total loss based on the reconstruction loss, KL divergence, and conditional loss. In particular, the secure distributed data collaboration system 102 determines a reconstruction loss. For instance, the reconstruction loss includes a mean squared error between the data produced from the decoder and the original data. To illustrate $(X-X_{gen})^2$, X indicates the original data and $X_{gen}$ indicates the generated data from the decoder. Moreover, the secure distributed data collaboration system 102 utilizes the reconstruction loss for the continuous columns of the data.

In one or more embodiments, the secure distributed data collaboration system 102 determines KL divergence loss. In particular, the secure distributed data collaboration system 102 minimizes the KL divergence loss by maximizing ELBO loss (e.g., evidence lower bound). For example, the secure distributed data collaboration system 102 utilizes the following:

$$ELBO(q) = Eq(Z)[\log p(Z, X)] - Eq(Z)[\log q(Z)]$$

For instance, where the encoder distribution is $q(z|x)=N(z|\mu(x), \Sigma(x))$ and $P(z)$ is the probability distribution of the latent variable, where N is the normal distribution.

Further, in one or more embodiments, the secure distributed data collaboration system 102 determines conditional loss. In particular, the secure distributed data collaboration system 102 determines conditional loss with:

$$LCondL = CE(\text{transformed data, mask, condition})$$

Similar to above, CE( ) returns the Cross Entropy Loss based on whether the transformed data of the synthetic dataset contains correct conditions for the chosen attributes through the mask. Accordingly, the secure distributed data collaboration system 102 ensures that the final reconstructed output from the decoders in the VAE implementation possesses the same condition, which was passed as input to the encoders, specifically for the discrete columns of the datasets.

As also discussed earlier, the secure distributed data collaboration system 102 determines an MSE loss. Similar to the GAN implementation, the secure distributed data collaboration system 102 in the VAE implementation also utilizes a hinge loss for all the losses. Similar to the above, the VAE implementation utilizes the following for the MSE loss:

$$L_{MSE} = f^{-1}_{transformerA}(c1_{genA}) - f^{-1}_{transformerB}(c1_{genB}))^2$$

For example, the secure distributed data collaboration system 102 for training an implementation of VAE utilizes the following algorithm:

---
Algorithm 2: VAE training for $k_{th}$ local setup
---
Input: Pre-processed data from individual servers
Output: Synthetic joined Data
1 for iteration i= 1 to NoOfEpochs do
2 # Local Setup
3 $C_k$ ←sampleCondVec( );
4 $D_k$ ← getBatchData( );
5 $Z_k$ ←$N_k$ ⊕ $C_k$;
6 $I_k$ ←LocalEncoder($Z_k$);
7 # Central Setup
8 I ←$I_1$ ⊕ $I_2$ ⊕ ... ⊕ $I_n$
9 M ←MixMatch(I);
10 mu, sigma ←CentralEncoder(M));
11 I ←getLatentVec(mu,sigma,$C_1,C_2,...,C_n$);
12 dec ←CentralDecoder(I);
13 # Local Setup
14 $reconD_k$ ←LocalDecoder(dec);
15 d ←calculateKLD+recon+condLoss($D_k$);
16 # Central Setup
17 mse ←CalculateMSE($reconD_k,D_k$);
18  BackProp( );
19 end
---

Figure 5A:
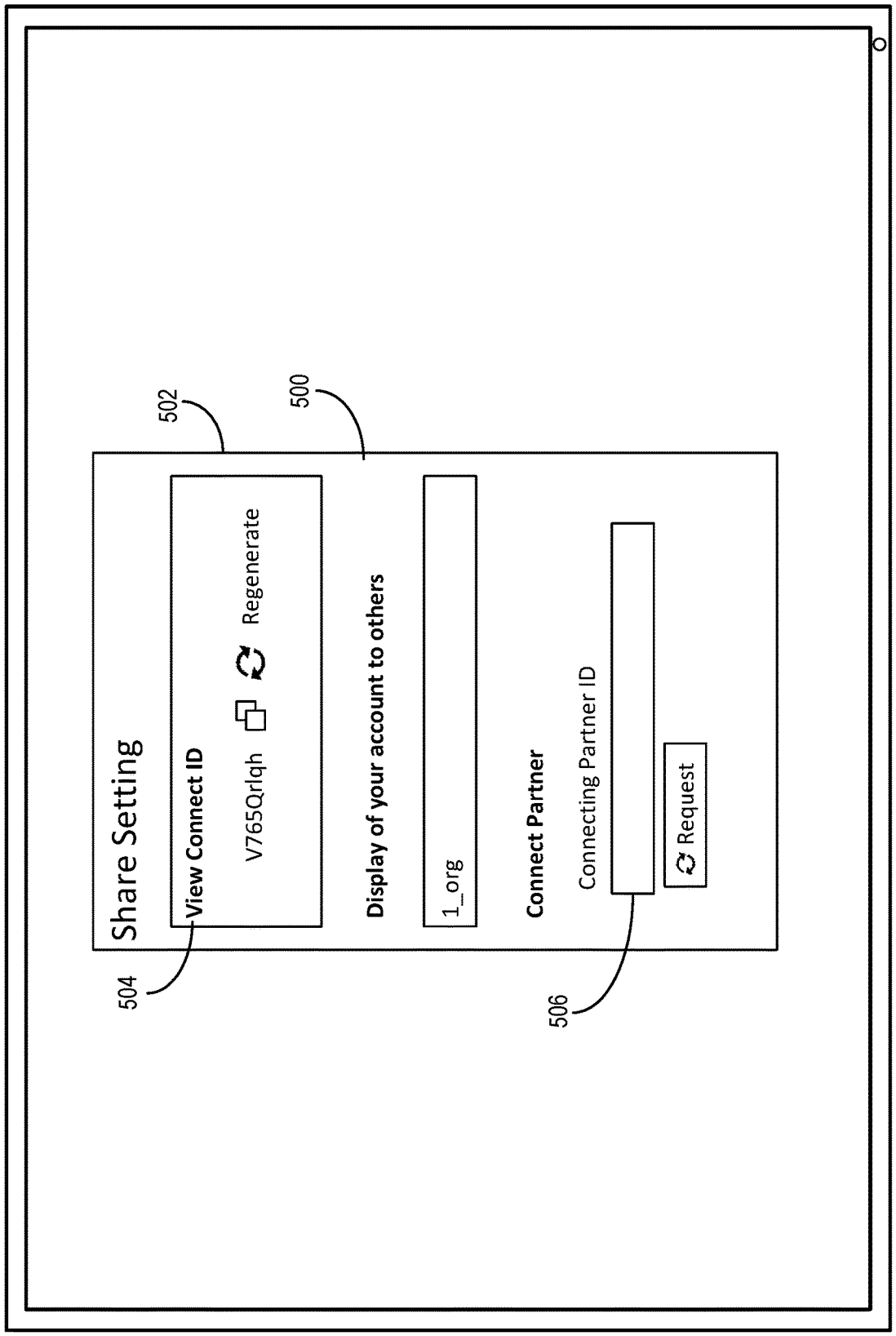
FIGS. 5A-5C illustrates example graphical user interfaces for performing data collaboration in accordance with one or more embodiments.
Figure 5B:
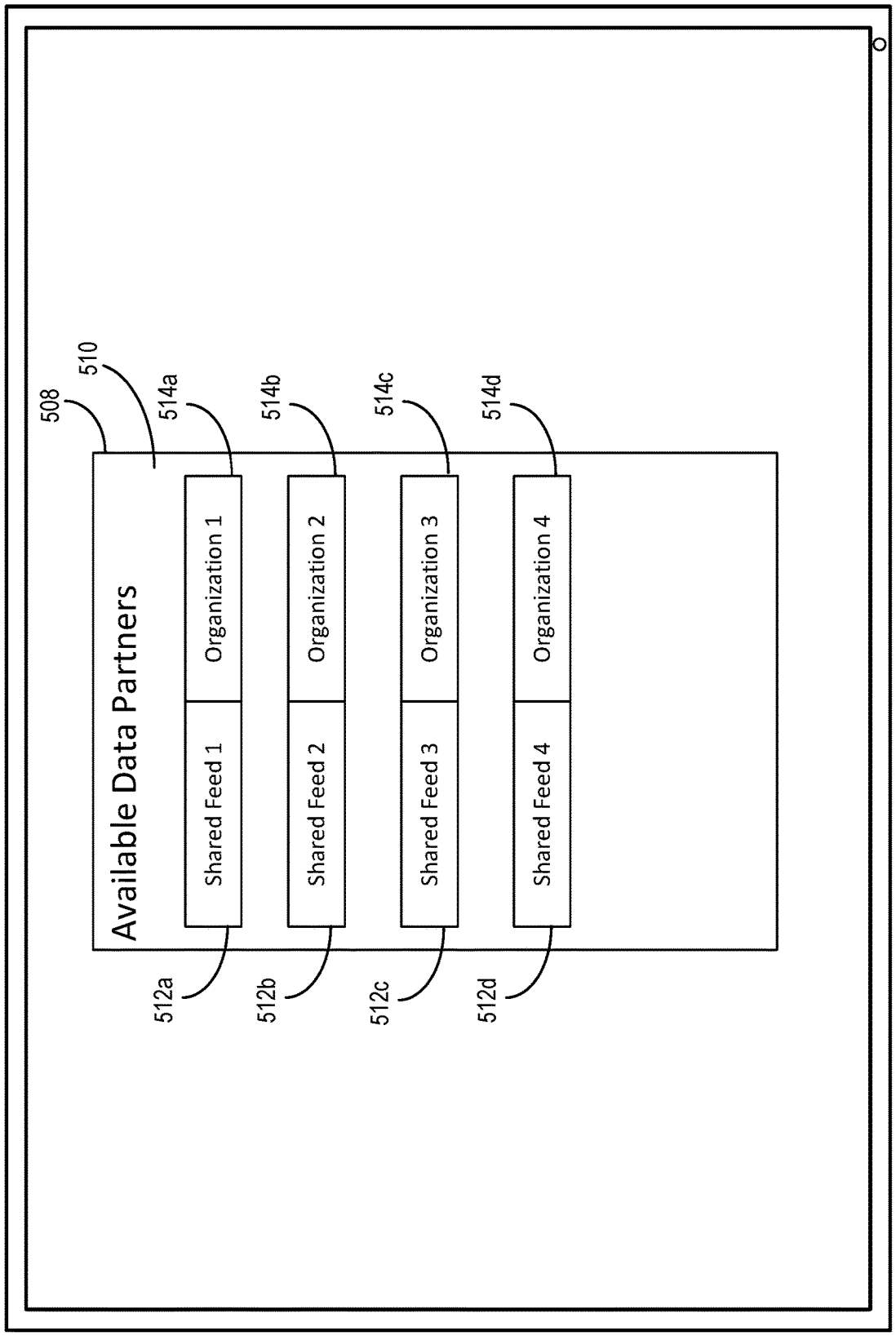
Figure 5C:
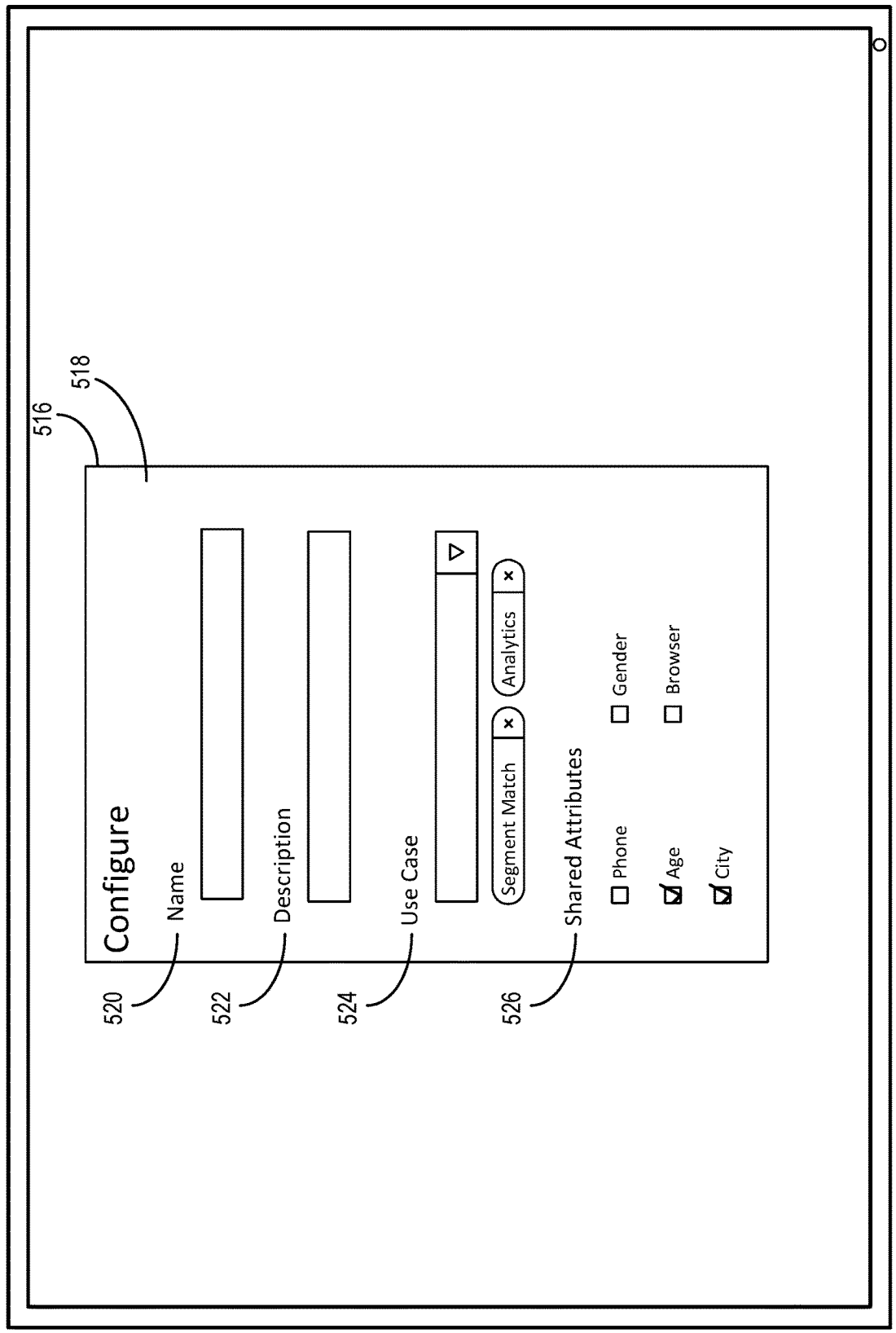

FIGS. 5A-5C illustrate graphical user interfaces which the secure distributed data collaboration system 102 causes a client device to provide for display. For example, FIG. 5A shows a client device 502 displaying via a graphical user interface 500 configuration settings for a data collaboration. In particular, FIG. 5A shows a connection identification element 504 and a partner connection identification element 506. For instance, a user of the client device 502 inputs the partner connection identification element 506. The partner connection identification element 506 corresponds with another organization to receive and share data with. Moreover, the user of the client device obtains the partner connection identification element 506, inputs the identification and send a request to collaborate with an organization corresponding with the partner connection identification element 506.

FIG. 5B shows the secure distributed data collaboration system 102 providing to a client device 508 via a graphical user interface 510 available data partners. For example, FIG. 5B shows available datasets 512a-512d and organizations 514a-514d. In particular, the organizations 514a-514d correspond with each of the available datasets 512a-512d. For instance, a user of the client device 508 selects an available dataset from the available datasets 512a-512d. Specifically, in response to selecting an available dataset, the secure distributed data collaboration system 102 performs the processes described in FIGS. 2-4B to generate a synthetic dataset, such that the raw information from the selected dataset is not exposed to other devices.

FIG. 5C illustrates the secure distributed data collaboration system 102 providing to a client device 518 via a graphical user interface 516 a data configuration interface. For example, FIG. 5C shows a name indication element 520 to name the dataset being shared with another organization, a description indication element 522 to provide a description of the dataset being shared, and a use case indication element 524. In particular, the use case indication element 524 provides guidance and ensures shared datasets are compatible with applicable data governance policies. Additionally, FIG. 5C shows a shared attribute indicator 526. For instance, the shared attribute indicator 526 provides an option to the user of the client device 518 to specify specific attributes within a dataset to share with another organization. To illustrate, FIG. 5C shows the user of the client device 518 selecting "age" and "city" to share from the dataset with another organization.

Figure 6A:
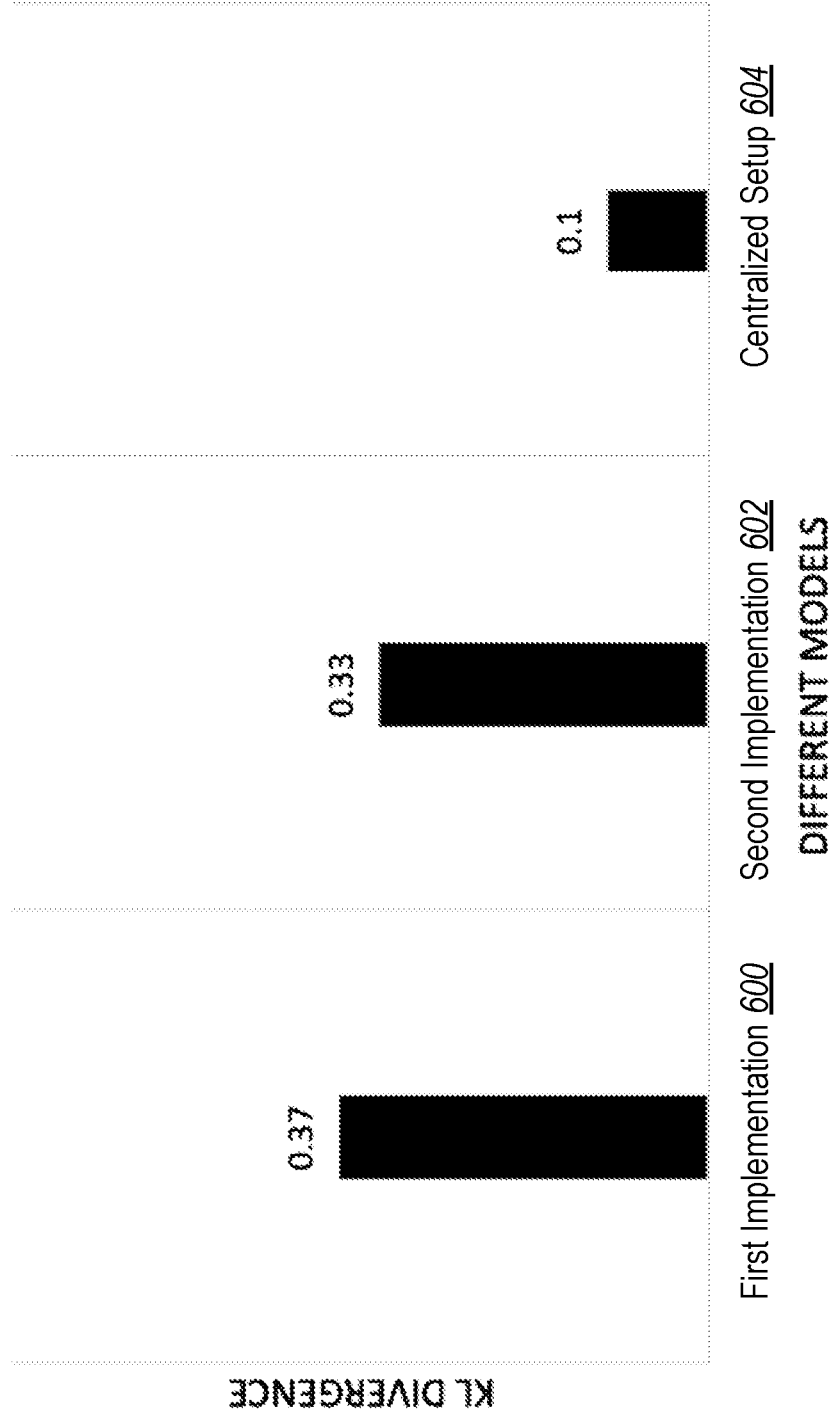
FIGS. 6A-6C illustrates example tables of statistical measures for the secure distributed data collaboration system in accordance with one or more embodiments.
Figure 6B:
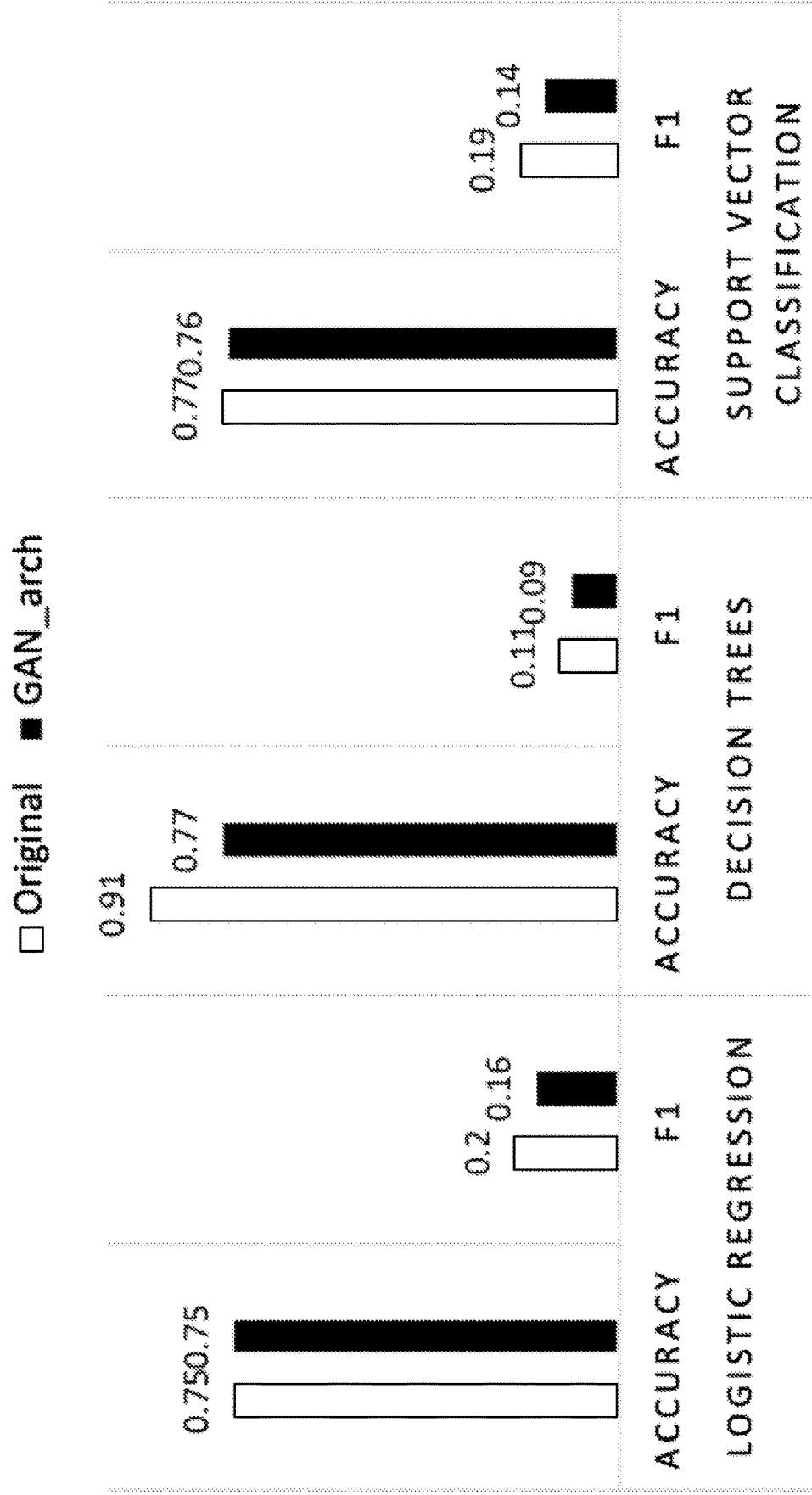
Figure 6C:
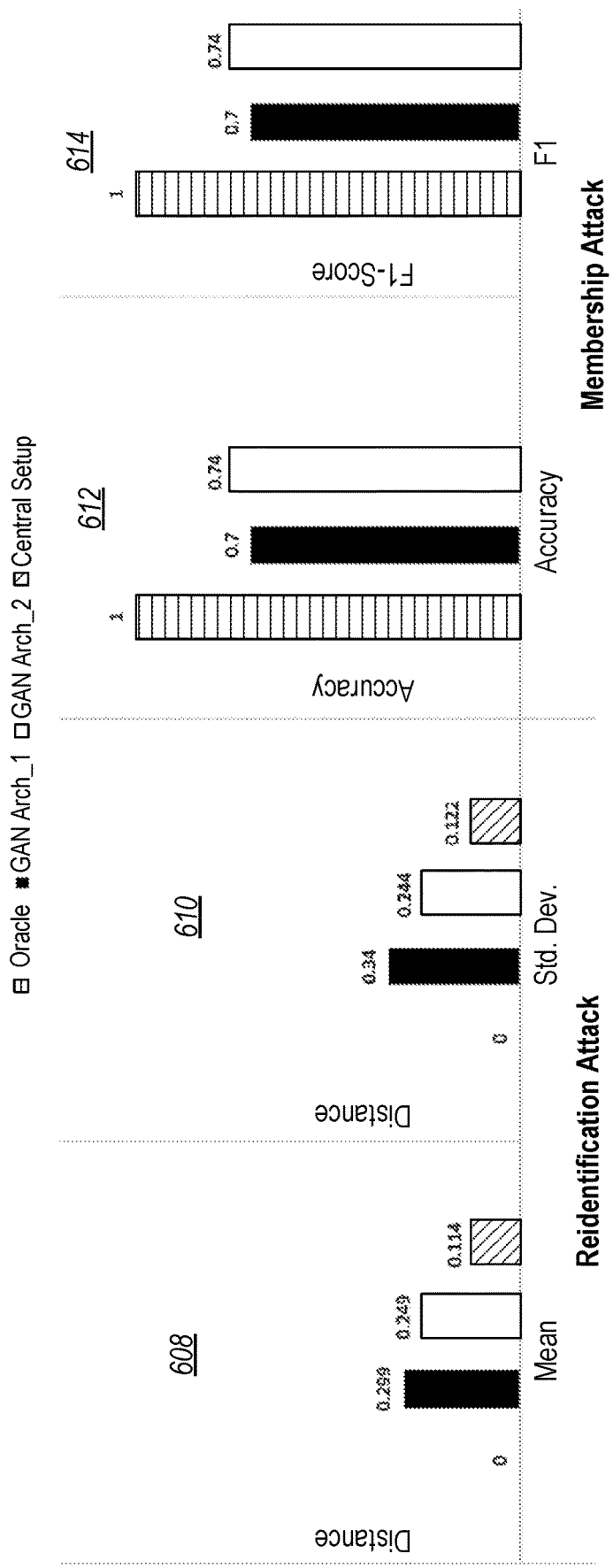

For FIGS. 6A-6C, experimenters compare the implementation within the secure distributed data collaboration system 102 with other data collaboration systems. For example, FIG. 6A shows a comparison of statistical similarity of synthetic datasets generated by the secure distributed data collaboration system 102 with an original dataset. In particular, experimenters utilize the KL divergence score to determine the statistical similarity. For KL divergence, 0 indicates that the statistical distributions are identical, if not identical then the KL divergence score is a positive value. For instance, FIG. 6A shows a first implementation 600 and a second implementation 602 implemented by the secure distributed data collaboration system 102. As shown, the synthetic datasets generated by the secure distributed data collaboration system 102 (e.g., the first implementation and the second implementation 602) perform on a similar level to a centralized setup 604 implemented within prior data collaboration systems. Accordingly, despite having no access to personally identifiable information and other raw information from the original dataset, the secure distributed data collaboration system 102 still manages to generate statistically similar datasets.

FIG. 6B illustrates the machine learning efficacy of the implementation in the secure distributed data collaboration system 102 tested on original data. For example, FIG. 6B shows an accuracy and F1 score. The F1 score symmetrically represents both precision and recall in a single metric. In particular, FIG. 6B shows similarity between the secure distributed data collaboration system 102 results and the original dataset for both accuracy and F1.

FIG. 6C illustrates an evaluation of privacy results. For example, FIG. 6C illustrates results for a re-identification attack and a membership attack. In particular, a re-identification attack and a membership attack are two different types of privacy attacks used to compromise the confidentiality of data. For instance, a re-identification attack attempts to link an individual's identity to their sensitive data within a dataset and a membership attack attempts to determine if a specific individual's data is included in a dataset without necessarily identifying the specific individual.

In particular, FIG. 6C shows that the mean and standard deviations of the re-identification attack in first column 608 and second column 610. The GAN implementation of the secure distributed data collaboration system 102 outperforms the centralized setup of prior data collaboration systems while maintaining a comparable standard deviation. Furthermore, a third column 612 and a fourth column 614 shows the accuracy and F1 score for the membership attack prediction is around 0.7 (ideal membership attack prediction ideally is around 0.5).

Figure 7:
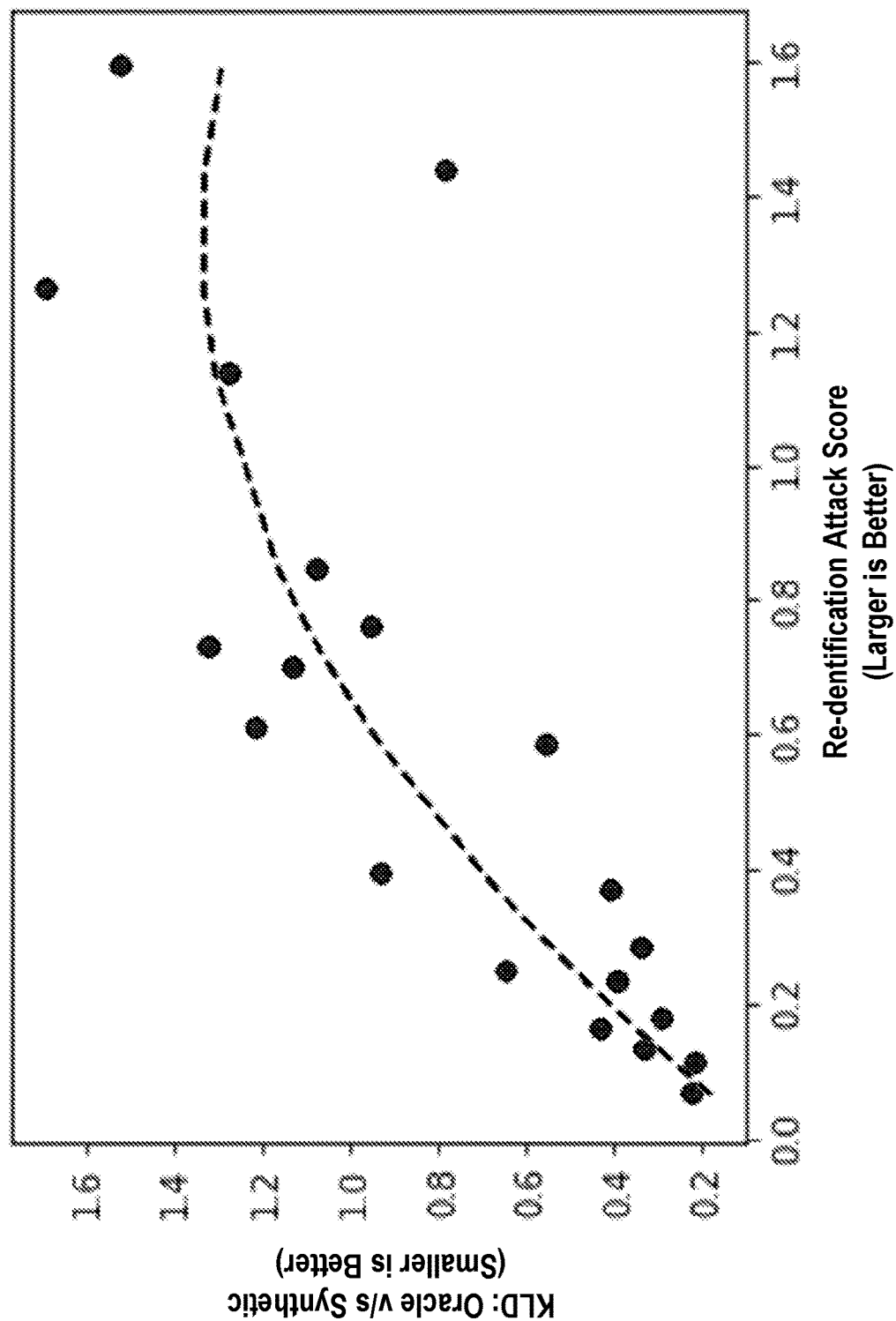
FIG. 7 illustrates an example graph of the trade-off between accuracy and precision in accordance with one or more embodiments.

FIG. 7 illustrates a tradeoff between accuracy of the generated synthetic dataset and privacy of sensitive information. For example, a desired level of privacy can vary from region to region. Depending on the regulatory framework within a specific geographic region, the secure distributed data collaboration system 102 adjusts the level of accuracy vs. the level of privacy. In particular, as shown in FIG. 7, with increased similarity of generated synthetic datasets to original data, the synthetic dataset becomes more vulnerable to privacy attacks. For instance, the secure distributed data collaboration system 102 provides to a user of the client device via a graphical user interface the ability to adjust the privacy parameter to generate synthetic datasets closer to the original dataset but with a higher risk for privacy breaches. Further, the secure distributed data collaboration system 102 provides via the graphical user interface of the client device an option to indicate a geographic location. The secure distributed data collaboration system 102 utilizes the indicated geographic location to determine applicable privacy laws and adjusts the privacy parameters to conform with the applicable privacy laws.

FIG. 8 illustrates the ability of the secure distributed data collaboration system 102 to collaborate between multiple parties. For example, FIG. 8 shows a number of organizations column 800, a KL divergence column 802, and a time taken for each Epoch column 804. In particular, as shown, with an increase in the number of organizations, the time linearly increases. Further, for an increase in the number of organizations the accuracy (e.g., the KL divergence) is not hampered.

FIG. 9 shows ablation study results. For example, a first ablation study 900 shows experimenters testing the secure distributed data collaboration system 102 with mixing layers and without mixing layers. In particular, the first ablation study 900 shows that the secure distributed data collaboration system 102 performs better with mixing layers in terms of KL divergence and model efficacy. Accordingly, the mixing layers assist the secure distributed data collaboration system 102 in learning better correlation between unique columns of different local sites.

For a second ablation study 902, FIG. 9 shows the results of two setups for the GAN implementation within the secure distributed data collaboration system 102. The first setup being an independent setup and the second setup being a dependent setup. For dependent sampling, the rows selected from a dataset of a local node are chosen at all other local nodes. For independent sampling, the selection of rows from a dataset at a local node is independent from subsequent rows chosen at other local nodes. For KL divergence and model efficacy, the independent and dependent setup performs similarly, however for privacy metrics (e.g., the DCR), the dependent sampling operates better in preserving privacy.

Figure 10:
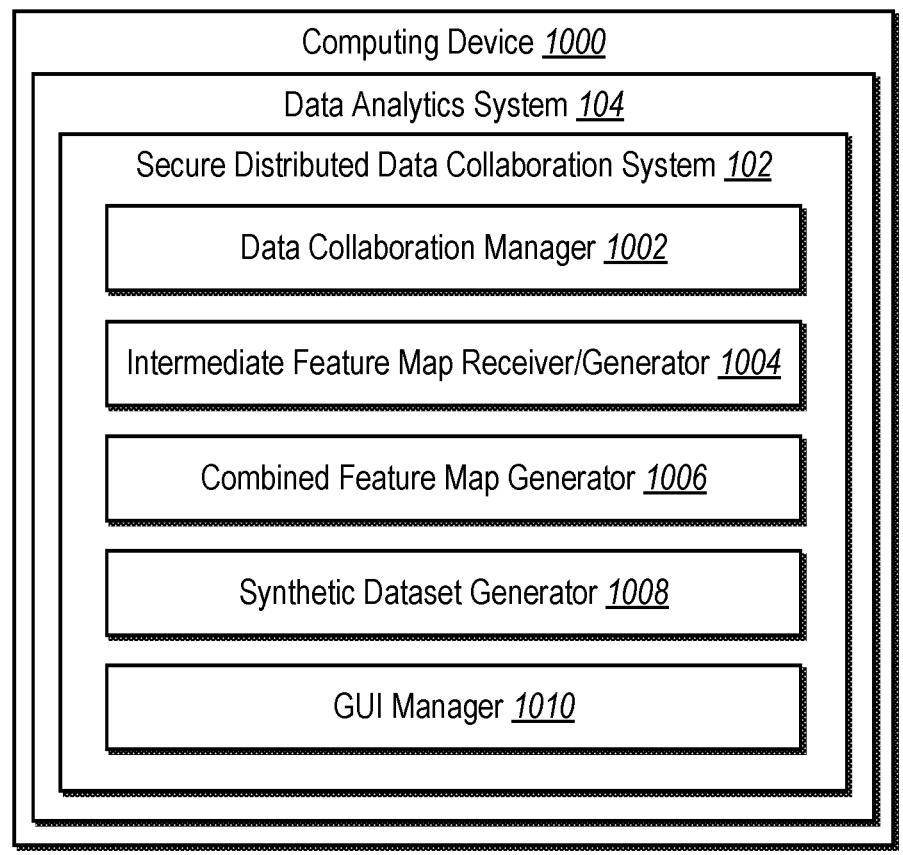
FIG. 10 illustrates an example schematic diagram of the secure distributed data collaboration system in accordance with one or more embodiments.

Turning to FIG. 10, additional detail will now be provided regarding various components and capabilities of the secure distributed data collaboration system 102. In particular, FIG. 10 illustrates an example schematic diagram of a computing device 1000 (e.g., the server(s) 106 and/or the client device 110) implementing the secure distributed data collaboration system 102 in accordance with one or more embodiments of the present disclosure for components 1000-1008. As illustrated in FIG. 10, the secure distributed data collaboration system 102 includes a data collaboration manager 1002, an intermediate feature map receiver/generator 1004, a combined feature map generator 1006, a synthetic dataset generator 1008, and a GUI manager 1010.

The data collaboration manager 1002 sends requests to local nodes to perform data collaborations. For example, the data collaboration manager 1002 receives an indication from a client device to perform a data collaboration. In particular, the data collaboration manager 1002 sends the received request to indicated local nodes. Further, the data collaboration manager 1002 manages pre-processing of datasets at local nodes by utilizing private set intersection models to determine an overlap of users.

The intermediate feature map receiver/generator 1004 receives intermediate feature maps from local nodes. For example, the intermediate feature map receiver/generator 1004 receives the intermediate feature maps and passes them to another component of the secure distributed data collaboration system 102. In particular, the intermediate feature map receiver/generator 1004 also causes local nodes the generate intermediate feature maps from datasets at the local nodes. Thus, the intermediate feature map receiver/generator 1004 manages the receiving and generation of intermediate feature maps.

The combined feature map generator 1006 receives the intermediate feature maps from the intermediate feature map receiver/generator 1004. For example, the combined feature map generator 1006 receives the intermediate feature maps, combines the intermediate feature maps and generates a combined feature map. In particular, the combined feature map generator 1006 utilizes a mixing matrix to combine the received intermediate feature maps.

The synthetic dataset generator 1008 generates synthetic datasets. For example, the synthetic dataset generator 1008 receives the combined feature map and generates the synthetic dataset. In particular, the synthetic dataset generator 1008 utilizes a central generative model to generate the synthetic dataset from the combined feature map. Moreover, the synthetic dataset generator 1008 passes the generated synthetic dataset to other components of the secure distributed data collaboration system 102.

The GUI manager 1010 provides for display the generated synthetic dataset. For example, the GUI manager 1010 receives the synthetic dataset from the synthetic dataset generator 1008 and provides for display the synthetic dataset on a graphical user interface. Further, the GUI manager 1010 also provides for display options for a user of a client device to configure data collaboration settings.

Each of the components 1002-1010 of the secure distributed data collaboration system 102 can include software, hardware, or both. For example, the components 1002-1010 can include one or more instructions stored on a computer-readable storage medium and executable by processors of one or more computing devices, such as a client device or server device. When executed by the one or more processors, the computer-executable instructions of the secure distributed data collaboration system 102 can cause the computing device(s) to perform the methods described herein. Alternatively, the components 1002-1010 can include hardware, such as a special-purpose processing device to perform a certain function or group of functions. Alternatively, the components 1002-1010 of the secure distributed data collaboration system 102 can include a combination of computer-executable instructions and hardware.

Furthermore, the components 1002-1010 of the secure distributed data collaboration system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1010 of the secure distributed data collaboration system 102 may be implemented as a stand-alone application, such as a desktop or mobile application. Furthermore, the components 1002-1010 of the secure distributed data collaboration system 102 may be implemented as one or more web-based applications hosted on a remote server. Alternatively, or additionally, the components 1002-1010 of the secure distributed data collaboration system 102 may be implemented in a suite of mobile device applications or "apps." For example, in one or more embodiments, the secure distributed data collaboration system 102 can comprise or operate in connection with digital software applications such as ADOBE® PHOTOSHOP, ADOBE® LIGHTROOM, ADOBE® AFTER EFFECTS, ADOBE® PREMIERE PRO, ADOBE® PREMIERE RUSH, ADOBE SPARK VIDEO, and/or ADOBE® PREMIERE. The foregoing are either registered trademarks or trademarks of Adobe Inc. in the United States and/or other countries.

Figure 11:
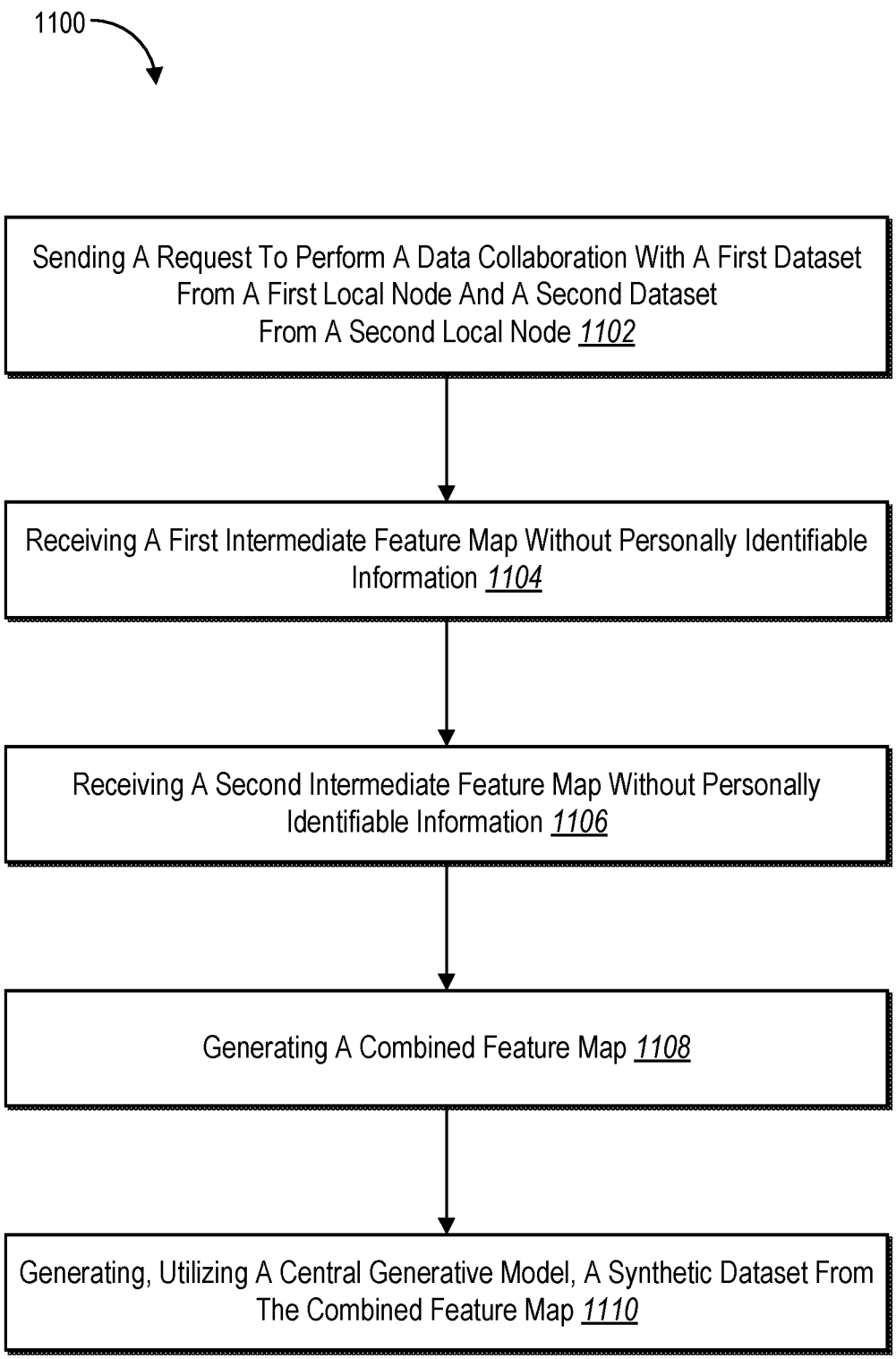
FIG. 11 illustrates a flowchart of a series of acts for generating a synthetic dataset in accordance with one or more embodiments.

FIGS. 1-10, the corresponding text, and the examples provide a number of different methods, systems, devices, and non-transitory computer-readable media of the secure distributed data collaboration system 102. In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

FIG. 11 illustrates a flowchart of a series of acts 1100 for generating a synthetic dataset in accordance with one or more embodiments. FIG. 11 illustrates acts according to one embodiment, alternative embodiments may omit, add to, reorder, and/or modify any of the acts shown in FIG. 11. In some implementations, the acts of FIG. 11 are performed as part of a method. For example, in some embodiments, the acts of FIG. 11 are performed as part of a computer-implemented method. Alternatively, a non-transitory computer-readable medium can store instructions thereon that, when executed by at least one processor, cause a computing device to perform the acts of FIG. 11. In some embodiments, a system performs the acts of FIG. 11. For example, in one or more embodiments, a system includes at least one memory device. The system further includes at least one server device configured to cause the system to perform the acts of FIG. 11.

The series of acts 1100 includes an act 1102 of sending a request to perform a data collaboration with a first dataset from a first local node and a second dataset from a second local node, an act 1104 of receiving a first intermediate feature map without personally identifiable information, an act 1106 of receiving a second intermediate feature map without personally identifiable information, an act 1108 of generating a combined feature map, and an act 1110 of generating, utilizing a central generative model, a synthetic dataset from the combined feature map.

In particular, the act 1102 can include sending a request to perform a data collaboration with a first dataset from a first local node and a second dataset from a second local node, wherein the first dataset and the second dataset comprises personally identifiable information, the act 1104 can include receiving a first intermediate feature map corresponding with the first dataset from the first local node without personally identifiable information, the act 1106 can include receiving a second intermediate feature map corresponding with the second dataset from the second local node without personally identifiable information, the act 1108 can include generating a combined feature map from the first intermediate feature map and the second intermediate feature map, and the act 1110 can include generating, utilizing a central generative model, a synthetic dataset from the combined feature map, wherein the synthetic dataset is statistically representative of the first dataset and the second dataset.

For example, in one or more embodiments, the series of acts 1100 includes determining, utilizing a private set intersection model, an overlap of users between the first dataset and the second dataset. Further, in one or more embodiments, the series of acts 1100 includes transforming, utilizing a transformer, discrete columns of the first dataset and discrete columns from the second dataset to columns corresponding to a number of categories from the discrete columns of the first dataset and a number of categories of the discrete columns from the second dataset and transforming, utilizing the transformer, continuous columns of the first dataset and continuous columns of the second dataset to an approximate value column.

Moreover, in one or more embodiments, the series of acts 1100 includes generating the combined feature map by utilizing a mixing matrix to mix the first intermediate feature map and the second intermediate feature map. Additionally, in one or more embodiments, the series of acts 1100 includes determining a correlation between various rows of the first intermediate feature map and the second intermediate feature map to generate the synthetic dataset.

Furthermore, in one or more embodiments, the series of acts 1100 includes the first intermediate feature map comprises utilizing a first local generator to generate the first intermediate feature map from the first dataset of the first local node and the second intermediate feature map comprises utilizing a second local generator to generate the second intermediate feature map from the second dataset of the second local node. Additionally, in one or more embodiments, the series of acts 1100 includes training the central generative model, the first local generator, and the second local generator by determining measures of loss for the first local generator, the second local generator, and the central generative model and modifying parameters of the first local generator, the second local generator, and the central generative model based on the determined measures of loss. Moreover, in one or more embodiments, the series of acts 1100 includes utilizing conditional vector sampling to account for datasets with skewed category frequencies.

In addition, in one or more embodiments, the series of acts 1100 includes receiving, from a client device, a request to perform a data collaboration between a first dataset from the client device and a second dataset from a local node comprising personally identifiable information, generating, via a generator of the client device, a first intermediate feature map without personally identifiable information, generating, via a generator of the local node, a second intermediate feature map without personally identifiable information, generating a combined feature map from the first intermediate feature map and the second intermediate feature map, generating, utilizing a central generative model, a synthetic dataset from the combined feature map, the synthetic dataset comprising a statistically representative dataset of the first dataset and the second dataset, and providing the synthetic dataset to the client device.

Further, in one or more embodiments, the series of acts 1100 includes siloing the second dataset from the client device, wherein the client device does not receive the second dataset. Moreover, in one or more embodiments, the series of acts 1100 includes performing pre-processing of the first dataset and the second dataset in response to receiving the request to perform the data collaboration, wherein the pre-processing comprises utilizing a private set intersection model to determine an overlap of users between the first dataset and the second dataset.

Furthermore, in one or more embodiments, the series of acts 1100 includes transforming a first discrete column of the first dataset to columns corresponding to a number of categories of the first discrete column of the first dataset and transforming a first discrete column of the second dataset to columns corresponding to a number of categories of the first discrete column of the second dataset.

Additionally, in one or more embodiments, the series of acts 1100 includes utilizing a transformer to transform a first continuous column of the first dataset and a first continuous column of the second dataset to an approximate value column by determining a difference between a first probability distribution statistic and each value of the first continuous column of the first dataset and determining a difference between a second probability distribution statistic and each value of the first continuous column of the second dataset. Moreover, in one or more embodiments, the series of acts 1100 includes generating the combined feature map by utilizing a mixing matrix to mix the first intermediate feature map and the second intermediate feature map and utilizing the central generative model to generate the synthetic dataset by determining a correlation between various rows of the first intermediate feature map and various rows of the second intermediate feature map.

Moreover, in one or more embodiments, the series of acts 1100 includes receiving a first intermediate feature map generated from a first dataset from a first local node, receiving a second intermediate feature map generated from a second dataset from a second local node, generating a combined feature map from the first intermediate feature map and the second intermediate feature map by utilizing a mixing matrix to mix the first intermediate feature map and the second intermediate feature, and generating, utilizing a central generative model, a synthetic dataset from the combined feature map by determining a correlation between various rows of the first intermediate feature map and the second intermediate feature map, wherein the synthetic dataset is statistically representative of the first dataset and the second dataset.

Further, in one or more embodiments, the series of acts 1100 includes performing pre-processing of the first dataset from the first local node and the second dataset from the second local node by utilizing a private set intersection model to determine an overlap of users without exposing raw information of the first dataset to the second local node and without exposing raw information of the second dataset to the first local node.

Additionally, in one or more embodiments, the series of acts 1100 includes transforming a first continuous column of the first dataset to an approximate value column by determining a difference between each value of the first continuous column of the first dataset and a first probability distribution statistic and transforming a first continuous column of the second dataset to the approximate value column by determining a difference between each value of the first continuous column of the second dataset and a second probability distribution statistic. Further, in one or more embodiments, the series of acts 1100 includes utilizing a transformer to transform a first discrete column of the first dataset to columns corresponding to a number of categories of the first discrete column of the first dataset and utilizing the transformer to transform a first discrete column of the second dataset to columns corresponding to a number of categories of the first discrete column of the second dataset.

Moreover, in one or more embodiments, the series of acts 1100 includes generating the first intermediate feature map from a first local generator of the first local node, generating the second intermediate feature map from a second local generator of the second local node, determining a first discriminator loss for a first local discriminator of the first local node, and determining a second discriminator loss for a second local discriminator of the second local node. Further, in one or more embodiments, the series of acts 1100 includes updating parameters of the central generative model by determining a first local generator loss to update parameters of the first local generator, determining a second local generator loss to update parameters of the second local generator, determining a combined measure of loss based on the first local generator loss, the second local generator loss and the synthetic dataset, and back-propagating the combined measure of loss to the central generative model.

In addition to the foregoing, one or more embodiments can also be described in terms of flowcharts comprising acts for accomplishing the particular result, as shown in FIG. 11. FIG. 11 may be performed with more or fewer acts. Further, the acts may be performed in different orders. Additionally, the acts described herein may be repeated or performed in parallel with one another or in parallel with different instances of the same or similar acts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
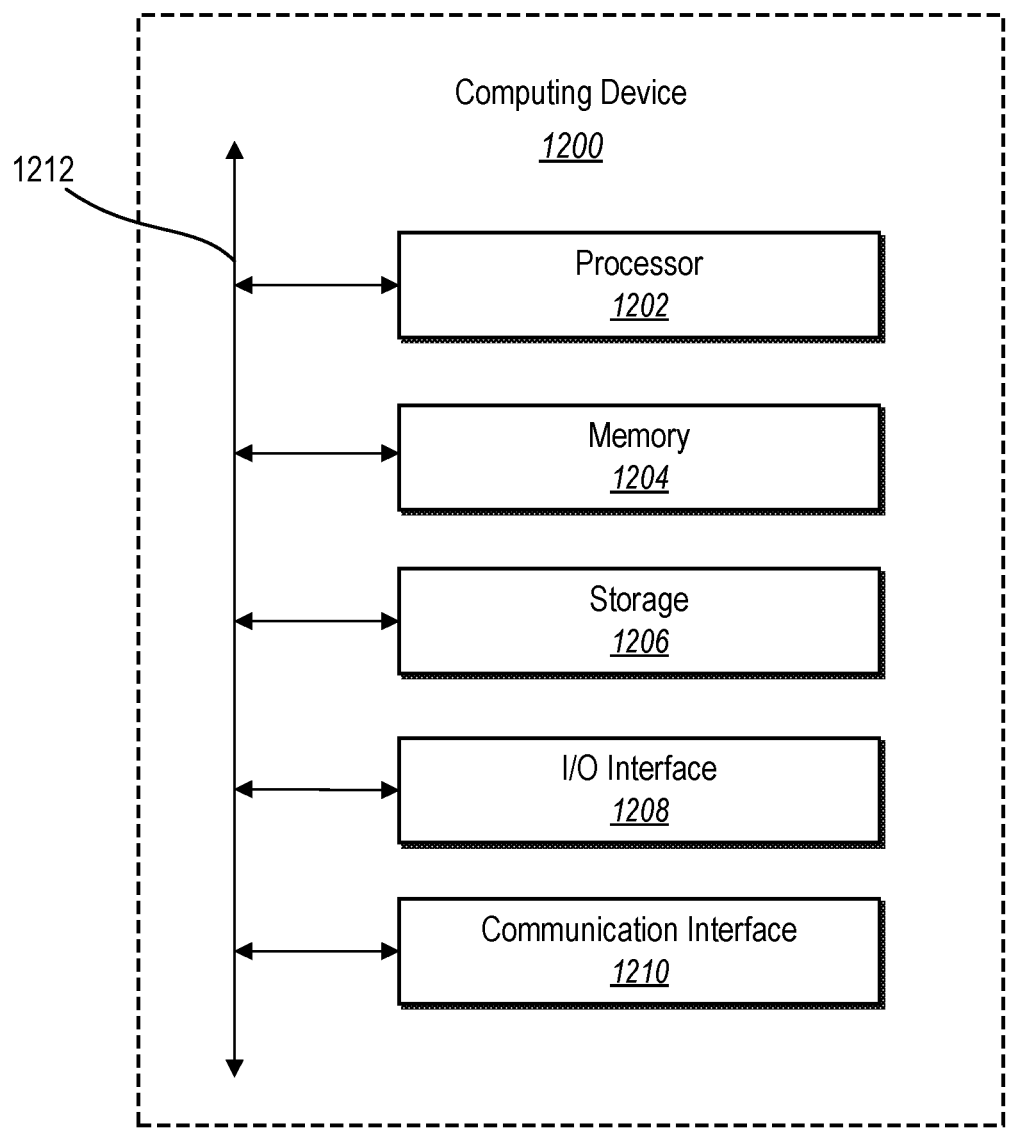
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., the server(s) 106 and/or the client device 110). In one or more embodiments, the computing device 1200 may be a mobile device (e.g., a mobile telephone, a smartphone, a PDA, a tablet, a laptop, a camera, a tracker, a watch, a wearable device). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 including storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
sending a request to perform a data collaboration with a first dataset from a first local node and a second dataset from a second local node, wherein the first dataset and the second dataset comprises personally identifiable information;
performing pre-processing of the first dataset from the first local node and the second dataset from the second local node by utilizing a private set intersection model to determine an overlap of users without exposing raw information of the first dataset to the second local node and without exposing raw information of the second dataset to the first local node;
receiving a first intermediate feature map corresponding with the first dataset from the first local node without personally identifiable information, wherein the first intermediate feature map is generated by transforming, via a first local generator, one or more columns of the first dataset and the first intermediate feature map statistically represents the first dataset;
receiving a second intermediate feature map corresponding with the second datasets from the second local node without personally identifiable information,
wherein the second intermediate feature map is generated by transforming, via a second local generator, one or more columns of the second dataset and the second intermediate feature map statistically represents the second dataset,
wherein personally identifiable information from the first local node stays siloed at the first local node and personally identifiable information from the second local node stays siloed at the second local node while still generating the first intermediate feature map that statistically represents the first dataset and generating the second intermediate feature map that statistically represents the second dataset;
generating a combined feature map from the first intermediate feature map and the second intermediate feature map; and
generating, utilizing a central generative model, a synthetic dataset from the combined feature map, wherein the synthetic dataset is statistically representative of the first dataset and the second dataset.

2. The computer-implemented method of claim 1, wherein generating the synthetic dataset comprises:
utilizing the central generative model as a centralized server to receive the combined feature map, wherein the first local node and the second local node are remote distributed devices relative to the central generative model; and
generating, utilizing the central generative model, the synthetic dataset, wherein personally identifiable information from the first local node and the second local node is not exposed to the central generative model.

3. The computer-implemented method of claim 2, further comprising:
training the central generative model, the first local generator, and the second local generator by:
determining measures of loss for the first local generator, the second local generator, and the central generative model; and
modifying parameters of the first local generator, the second local generator, and the central generative model based on the determined measures of loss.

4. The computer-implemented method of claim 3, wherein training the central generative model, the first local generator, and the second local generator further comprises utilizing conditional vector sampling to account for datasets with skewed category frequencies.

5. The computer-implemented method of claim 1, wherein generating the combined feature map comprises utilizing the central generative model to combine the first intermediate feature map and the second intermediate feature map.

6. The computer-implemented method of claim 1, further comprising:
transforming, utilizing a transformer, discrete columns of the first dataset and discrete columns from the second dataset to columns corresponding to a number of categories from the discrete columns of the first dataset and a number of categories of the discrete columns from the second dataset; and
transforming, utilizing the transformer, continuous columns of the first dataset and continuous columns of the second dataset to an approximate value column.

7. The computer-implemented method of claim 1, further comprising generating the combined feature map by utilizing a mixing matrix to mix the first intermediate feature map and the second intermediate feature map.

8. The computer-implemented method of claim 1, further comprising determining a correlation between various rows of the first intermediate feature map and the second intermediate feature map to generate the synthetic dataset.

9. A system comprising:
one or more memory devices; and
one or more processors configured to cause the system to:
receive, from a client device, a request to perform a data collaboration between a first dataset from the client device and a second dataset from a local node comprising personally identifiable information;
perform pre-processing of the first dataset from the client device and the second dataset from the local node by utilizing a private set intersection model to determine an overlap of users without exposing raw information of the first dataset to the local node and without exposing raw information of the second dataset to the client device;
generate, via a generator of the client device, a first intermediate feature map without personally identifiable information, wherein the first intermediate feature map is generated by transforming, via a first local generator, one or more columns of the first dataset and the first intermediate feature map statistically represents the first dataset;
generate, via a generator of the local node, a second intermediate feature map without personally identifiable information,
wherein the second intermediate feature map is generated by transforming, via a second local generator, one or more columns of the second dataset and the second intermediate feature map statistically represents the second dataset, wherein personally identifiable information from the client device stays siloed at the client device and personally identifiable information from the local node stays siloed at the local node while still generating the first intermediate feature map that statistically represents the first dataset and generating the second intermediate feature map that statistically represents the second dataset;

generate a combined feature map from the first intermediate feature map and the second intermediate feature map;

generate, utilizing a central generative model, a synthetic dataset from the combined feature map, the synthetic dataset comprising a statistically representative dataset of the first dataset and the second dataset; and provide the synthetic dataset to the client device.

10. The system of claim 9, wherein the one or more processors are configured to cause the system to generate the combined feature map using the central generative model by combining the first intermediate feature map and the second intermediate feature map and the central generative model is a centralized server.

11. The system of claim 9, wherein the one or more processors are configured to cause the system to generate, utilizing the central generative model, the synthetic dataset, wherein personally identifiable information from the client device and the local node is not exposed to the central generative model.

12. The system of claim 9, wherein the one or more processors are configured to cause the system to utilize a transformer to:
transform a first discrete column of the first dataset to columns corresponding to a number of categories of the first discrete column of the first dataset; and
transform a first discrete column of the second dataset to columns corresponding to a number of categories of the first discrete column of the second dataset.

13. The system of claim 9, wherein the one or more processors are configured to cause the system to:
utilize a transformer to transform a first continuous column of the first dataset and a first continuous column of the second dataset to an approximate value column by:
determining a difference between a first probability distribution statistic and each value of the first continuous column of the first dataset; and
determining a difference between a second probability distribution statistic and each value of the first continuous column of the second dataset.

14. The system of claim 9, wherein the one or more processors are configured to cause the system to:
generate the combined feature map by utilizing a mixing matrix to mix the first intermediate feature map and the second intermediate feature map; and
utilize the central generative model to generate the synthetic dataset by determining a correlation between various rows of the first intermediate feature map and various rows of the second intermediate feature map.

15. A non-transitory computer-readable medium storing executable instructions which, when executed by a processing device, cause the processing device to perform operations comprising:
performing pre-processing of a first dataset from a first local node and a second dataset from a second local node by utilizing a private set intersection model to determine an overlap of users without exposing raw information of the first dataset to the second local node and without exposing raw information of the second dataset to the first local node;

receiving a first intermediate feature map generated from the first dataset from the first local node without personally identifiable information by transforming, via a first local generator, one or more columns of the first dataset and the first intermediate feature map statistically represents the first dataset;

receiving a second intermediate feature map generated from the second dataset from the second local node without personally identifiable information by transforming, via a second local generator, one or more columns of the second dataset and the second intermediate feature map statistically represents the second dataset, wherein personally identifiable information from the first local node stays siloed at the first local node and personally identifiable information from the second local node stays siloed at the second local node while still generating the first intermediate feature map that statistically represents the first dataset and generating the second intermediate feature map that statistically represents the second dataset;

generating a combined feature map from the first intermediate feature map and the second intermediate feature map by utilizing a mixing matrix to mix the first intermediate feature map and the second intermediate feature map; and generating, utilizing a central generative model, a synthetic dataset from the combined feature map by determining a correlation between various rows of the first intermediate feature map and the second intermediate feature map, wherein the synthetic dataset is statistically representative of the first dataset and the second dataset.

16. The non-transitory computer-readable medium of claim 15, wherein:
generating the combined feature map comprises utilizing the central generative model to combine the first intermediate feature map and the second intermediate feature map; and
generating the synthetic dataset comprises:
utilizing the central generative model as a centralized server to receive the combined feature map, wherein the first local node and the second local node are remote distributed devices relative to the central generative model; and
generating, utilizing the central generative model, the synthetic dataset, wherein personally identifiable information from the first local node and the second local node is not exposed to the central generative model.

17. The non-transitory computer-readable medium of claim 15, wherein the operations further comprise:
transforming a first continuous column of the first dataset to an approximate value column by determining a difference between each value of the first continuous column of the first dataset and a first probability distribution statistic; and
transforming a first continuous column of the second dataset to the approximate value column by determining a difference between each value of the first continuous column of the second dataset and a second probability distribution statistic.

18. The non-transitory computer-readable medium of claim 15, wherein the operations further comprise:
- utilizing a transformer to transform a first discrete column of the first dataset to columns corresponding to a number of categories of the first discrete column of the first dataset; and
- utilizing the transformer to transform a first discrete column of the second dataset to columns corresponding to a number of categories of the first discrete column of the second dataset.

19. The non-transitory computer-readable medium of claim 15, wherein the operations further comprise:
- determining a first discriminator loss for a first local discriminator of the first local node; and
- determining a second discriminator loss for a second local discriminator of the second local node.

20. The non-transitory computer-readable medium of claim 15, wherein the operations further comprise:
- updating parameters of the central generative model by:
    - determining a first local generator loss to update parameters of the first local generator;
    - determining a second local generator loss to update parameters of the second local generator;
    - determining a combined measure of loss based on the first local generator loss, the second local generator loss and the synthetic dataset; and
    - back-propagating the combined measure of loss to the central generative model.

* * * * *